United States Patent
Cui et al.

(10) Patent No.: US 9,681,374 B2
(45) Date of Patent: Jun. 13, 2017

(54) APPARATUS AND METHOD FOR CONTROLLING A CHANGE OF OPERATION STATE OF A CELL

(71) Applicant: Sony Corporation, Tokyo (JP)

(72) Inventors: Qimei Cui, Beijing (CN); Jin Xu, Beijing (CN); Ningyu Chen, Beijing (CN); Jiahui Liu, Beijing (CN); Yu Sun, Beijing (CN); Rui Gao, Beijing (CN)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 14/668,148

(22) Filed: Mar. 25, 2015

(65) Prior Publication Data

US 2015/0312867 A1 Oct. 29, 2015

(30) Foreign Application Priority Data

Apr. 28, 2014 (CN) .......................... 2014 1 0175578

(51) Int. Cl.
*H04B 1/00* (2006.01)
*H04B 7/00* (2006.01)
*H04W 52/02* (2009.01)

(52) U.S. Cl.
CPC ......... *H04W 52/0206* (2013.01); *Y02B 60/50* (2013.01)

(58) Field of Classification Search
CPC ............ H04B 7/15528; H04W 52/244; H04W 72/0426; H04W 72/082; H04W 88/08
USPC .......................................................... 455/68
See application file for complete search history.

(56) References Cited

U.S. PATENT DOCUMENTS

| 2012/0165027 A1* | 6/2012 | Kim | ................... H04W 48/02 455/446 |
| 2013/0217402 A1* | 8/2013 | Lin | ................... H04W 72/12 455/450 |

* cited by examiner

*Primary Examiner* — Ankur Jain
(74) *Attorney, Agent, or Firm* — Oblon, McClelland, Maier & Neustadt, L.L.P.

(57) ABSTRACT

The present application discloses an apparatus and a method for controlling a change of operation state of a cell and a base station including the apparatus. The apparatus includes: a state change determining unit, configured to determine the change of operation state to be performed by the cell to be controlled, the change of operation state comprising change from active state to sleep state; and a sleep mode determining unit, configured to determine a sleep mode for the cell to be controlled so that the cell to be controlled has a different sleep mode from its adjacent cells, when the state change determining unit determines to perform the change of operation state of the cell to be controlled.

20 Claims, 13 Drawing Sheets

| Control Signal | Sleep Mode |
|---|---|
| 001 | Sub-frame sleep mode 1 |
| 010 | Sub-frame sleep mode 2 |
| 011 | Sub-frame sleep mode 3 |
| 101 | Sub-carrier sleep mode 1 |
| 110 | Sub-carrier sleep mode 2 |
| 111 | Sub-carrier sleep mode 3 |

APPARATUS AND METHOD FOR CONTROLLING A CHANGE OF OPERATION STATE OF A CELL

FIELD OF THE INVENTION

The present invention generally relates to the field of wireless communications, and particularly relates to the advanced long term evolution (LTE-A) technique. More particularly, the present invention relates to an apparatus and method for controlling a change of operation state of a cell, with respect to the requirement of the critical techniques of LTE-A based on the setting of cells in 3GPP Release 12.

BACKGROUND OF THE INVENTION

LTE is a long term evolution of the technique standard of the Universal Mobile Telecommunications System (UMTS) established by the 3rd Generation Partnership Project (3GPP) organization, and is approved regularly and started in the meeting of 3GPP TSG RAN #26 in December, 2004, in Toronto. An LTE system introduces critical transmission techniques such as Orthogonal Frequency Division Multiplexing (OFDM) and Multiple-Input Multiple-Output (MIMO) of multiple antennas, and increases the frequency spectral efficiency and data transmission rate significantly. The peak data rate can reach 50 Mbit/s for uplink and 100 Mbit/s for downlink. Further, the system supports various distribution of bandwidth, and thus the distribution of frequency spectral is more flexible, with the capacity and coverage of the system significantly increased. The architecture of the LIE wireless networks is more flattened, reducing the system delay and reducing the costs for network building and maintaining.

In addition, in LTE-A, in order to acquire sufficient transmission bandwidth (such as 100 MHz) to support higher uplink and downlink peak data rate (such as 1 Gbit/s for downlink and 500 Mbit/s for uplink), the carrier aggregation technique can be adopted to aggregate a plurality of component carriers to obtain transmission of high bandwidth.

In LTE R12, small cells are introduced. A small cell is a wireless access node with low power, operates in an unlicensed or licensed frequency spectral, and can cover a range of 10 m to 200 m. In contrast, the coverage range of a macro cell can reach as much as several kilometers. The small cell fuses the techniques of femtocell, picocell, microcell and distributed wireless techniques. The small cell has a very small volume and can be used indoor and outdoor. Generally, the small cell can cover the indoor space of about 10 m or a range of 2 kilometers in the open air. As shown in FIG. 1, where the multiple of smaller circles represent small cells and the three relatively larger circles represent macro cells, it can be seen that the small cells are characterized in that they are densely disposed with the coverage ranges crossed mutually. In the scenario of LTE-A heterogeneous networks, the macro cells realize wide area coverage and the small cells realize Hotpoint coverage.

Considering that a large amount of small cells would appear in the future applications, it becomes more important to enable more, effective utilization of energy and network resources in the networks. Of course, it is also necessary to guarantee the communication quality of the user terminals accessing into the cells. The "cells" in the context includes both macro cells and small cells if not specified otherwise.

The small cells can be divided into different clusters. In order to avoid serious interferences in uplink and downlink between different small cells, the small cells in the same cluster generally adopt the same uplink/downlink configuration. However, even this, users especially edge users in adjacent small cells may produce interferences when transmitting data. In addition, users of macro cells may also be subject to interferences from communications of other macro cells or small cells.

SUMMARY OF THE INVENTION

In the following, an overview of the present invention is given simply to provide basic understanding to some aspects of the present invention. It should be understood that this overview is not an exhaustive overview of the present invention. It is not intended to determine a critical part or an important part of the present invention, nor to limit the scope of the present invention. An object of the overview is only to give some concepts in a simplified manner, which serves as a preface of a more detailed description described later.

In view of the above demand, the present invention, according to an aspect of the present invention, an apparatus for controlling a change of operation state of a cell is provided, including: a state change determining unit, configured to determine the change of operation state to be performed by the cell to be controlled, the change of operation state including change from active state to sleep state; and a sleep mode determining unit, configured to determine a sleep mode for the cell to be controlled so that the cell to be controlled has a different sleep mode from its adjacent cells, when the state change determining unit determines to perform the change of operation state of the cell to be controlled.

According to another aspect of the present invention, an apparatus for changing operation state of a cell is provided, including: a control signal receiving unit, configured to receive a control signal from the apparatus for controlling above mentioned; and a state changing unit, configured to change the operation state of the cell based on the control signal.

According to still another aspect of the present invention, a base station is further provided, including one of the two kinds of apparatus mentioned above.

According to one aspect of the present invention, a method for controlling a change of operation state of a cell is provided, including: determining the change of operation state to be performed by the cell to be controlled, the change of operation state including change from active state to sleep state; and determining a sleep mode for the cell to be controlled so that the cell to be controlled has a different sleep mode from its adjacent cell, when it is determined to perform the change of operation state of the cell to be controlled.

According to other aspects of the present invention, there are further provided computer program codes and computer program product for implementing the above mentioned method for controlling a change of operation state of a cell, as well as a computer readable storage medium on which computer program codes for realizing the aforementioned method for controlling a change of operation state of a cell are recorded. On the other hand, there are also provided computer program codes and computer program product for implementing the above mentioned method for changing operation state of a cell, as well as a computer readable storage medium on which computer program codes for realizing the aforementioned method for changing operation state of a cell are recorded.

According to another aspect of the present invention, there is provided a non-transitory computer readable storage device having instructions stored therein that when executed by processing circuitry perform a method for controlling a change of operation state of a cell, the method comprising: determining the change of operation state to be performed by the cell to be controlled, the change of operation state comprising change from active state to sleep state; and determining a sleep mode for the cell to be controlled so that the cell to be controlled has a different sleep mode from its adjacent cell, when it is determined to perform the change of operation state of the cell to be controlled.

The method for controlling a change of operation state of a cell of the present application prevents adjacent cells from using the same network resources to transmit data simultaneously by setting different sleep modes for them, thereby decreasing the interference levels between adjacent cells and effectively increasing the resources usage efficiency.

These and other advantages of the present invention will be more apparent by illustrating in detail a preferred embodiment of the present invention in conjunction with accompanying drawings below.

BRIEF DESCRIPTION OF THE DRAWINGS

To further set forth the above and other advantages and features of the present invention, detailed description will be made in the following taken in conjunction with accompanying drawings in which identical or like reference signs designate identical or like components. The accompanying drawings, together with the detailed description below, are incorporated into and form a part of the specification. It should be noted that the accompanying drawings only illustrate, by way of example, typical embodiments of the present invention and should not be construed as a limitation to the scope of the invention. In the accompanying drawings.

DETAILED DESCRIPTION OF THE INVENTION

An exemplary embodiment of the present invention will be described hereinafter in conjunction with the accompanying drawings. For the purpose of conciseness and clarity, not all features of an embodiment are described in this specification. However, it should be understood that multiple decisions specific to the embodiment have to be made in a process of developing any such embodiment to realize a particular object of a developer, for example, conforming to those constraints related to a system and a business, and these constraints may change as the embodiments differs. Furthermore, it should also be understood that although the development work may be very complicated and timeconsuming, for those skilled in the art benefiting from the present disclosure, such development work is only a routine task.

Here, it should also be noted that in order to avoid obscuring the present invention due to unnecessary details, only a device structure and/or processing steps closely related to the solution according to the present invention are illustrated in the accompanying drawing, and other details having little relationship to the present invention are omitted.

<The First Embodiment>

Figure 2:
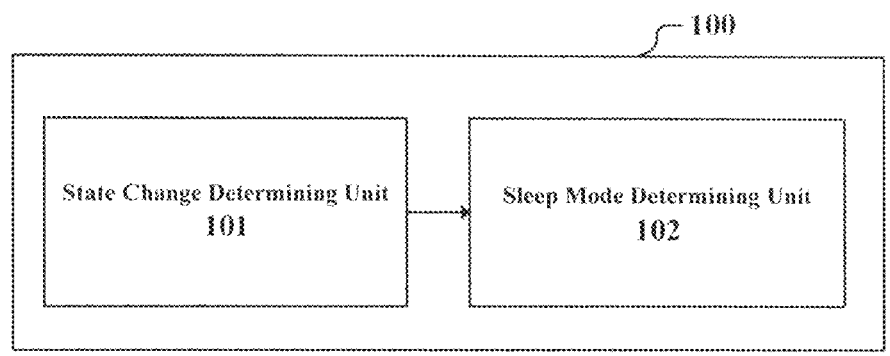
FIG. 2 is a structural block diagram of the apparatus for controlling a change of operation state of a cell according to an embodiment of the present application.

FIG. 2 illustrates an apparatus 100 for controlling a change of operation state of a cell according to an embodiment of the present application. As shown in FIG. 2, the apparatus 100 includes: a state change determining unit 101, configured to determine the change of operation state to be performed by the cell to be controlled, the change of operation state including change from active state to sleep state; and a sleep mode determining unit 102, configured to determine a sleep mode for the cell to be controlled so that the cell to be controlled has a different sleep mode from its adjacent cells, when the state change determining unit 101 determines to perform the change of operation state of the cell to be controlled.

Specifically, the state change determining unit 101 determines whether a certain cell to be controlled located in the controlling range of the apparatus 100 to perform changing of operation state and how to change such as turning off or on a part of the function of its base station, i.e., sleeping to different extent, according to a certain criteria. The cell to be controlled herein can be a small cell, or a macro cell. As for a macro cell, for example, its users may be subject to interferences from communications of small cells or other macro cells. In this case, the state change determining unit 101 can determine the sleep for these users subjected to the interferences, for example, subject them to the sub-frame sleep or sub-carrier sleep, etc.

It is to be understood that the state change determining unit 101 can use any manner to determine whether to perform changing of operation state and how to change. For example, the state change determining unit 101 can perform the above determination based on information about at least one of communication quality, interferences and load acquired by the apparatus 100. The interferences between the cell to be controlled and the adjacent cells are mutual, that is, they include two aspects of the interferences of the cell to be controlled to the adjacent cells and the interferences of the adjacent cells to the cell to be controlled. In the following, an example of the specific operation manner of the state change determining unit 101 will be described in detail in the second embodiment.

The state change determining unit 101 can directly detect the cell to be controlled in the controlling range of the apparatus 100 to acquire the above mentioned information. Alternatively, the detection can be performed by each cell to be controlled respectively, the detected information being reported to the state change determining unit 101. Depending on the type and the content of the information, the state change determining unit 101 determines the change of operation state to be performed, i.e., the change of level of sleep to be performed, correspondingly.

In the apparatus 100, multiple levels of sleep can be provided. When the sleep of level is lower, it means that the cell is more active, and a ratio of the part of function of the base station thereof which is turned on is larger, otherwise the ratio is smaller. In one example, the levels of sleep include at least one of sub-frame sleep and sub-carrier sleep.

Hereinafter, both the sub-carrier downlink sleep and the sub-carrier uplink and downlink sleep are regarded as sub-carrier sleep in the case that distinguishing in particular is not necessary.

Figure 3:
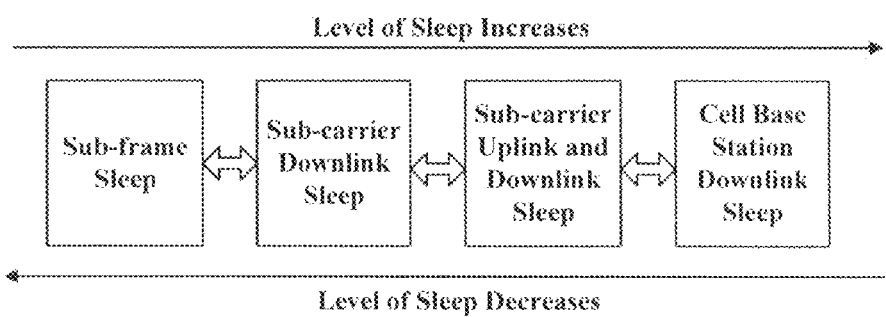
FIG. 3 is a schematic drawing illustrating the levels of sleep according to an embodiment of the present application.

FIG. 3 illustrates a specific example of the setting of levels of sleep, including: sub-frame sleep, sub-carrier downlink sleep, sun-carrier uplink and downlink sleep, and cell base station downlink sleep. The levels of sleep are gradually increased from the sub-frame sleep to the cell base station downlink sleep.

In this example, the sub-fame sleep means part of the sub-frames are closed in the turned on carriers of the cell base station, sub-carrier downlink sleep means all of the downlink sub-frames are closed in part of the carriers of the cell base station, sub-carrier uplink and downlink sleep means all of the downlink sub-frames and uplink sub-frames are closed in part of the carriers of the cell base station, and the cell base station downlink sleep means all of the downlink sub-frames of the cell base station are closed. It can be seen that, the higher the level of sleep of the cell is, the less its consumed energy is. Generally, the cell base station downlink sleep is only for small cells.

Although four levels of sleep are shown as an example herein, the division of levels of sleep is not limited thereto. Instead, various dividing manners can be adopted, for example, in order to reduce the system complexity, two levels or other number of levels can be used: sub-frame sleep, and sub-carrier sleep; or cell base station downlink sleep, and cell base station downlink sleep with uplink sub-frame sleep at the same time. If the number of levels becomes more, the granularity for controlling becomes finer.

Moreover, it is also possible to set only one level of sleep such as sub-frame sleep or sub-carrier sleep besides the active state.

After the state change determining unit 101 determines the change of operation state to be performed, the sleep mode determining unit 102 determines the sleep mode for the cell to be controlled according to the following principle: when the cell to be controlled sleeps in the sleep mode, this cell has a different sleep mode from its adjacent cells.

Herein, a sleep mode refers to a setting mode of the cell base station suspending usage of particular transmission resources. As stated above, the small cells in the same cluster generally adopt the same configuration for uplink and downlink. However, even this, the edge uses of the adjacent small cells might still produce interferences when transmitting data, or the users of macro cells may be subjected to interferences from communications of adjacent cells. The edge users described herein includes users with low signal to interference plus noise ratio, and/or users which are far from the cell base station in geographical location. For example, the cell base station can acquire the distance from the user terminal to the base station by GPS or by performing calculation with a method such as the method using the time advance (TA) to be described in the following, and take the user terminal as an edge user when the distance exceeds a certain limit. Alternatively, the users with a throughput ranked in the last 10% among the cell users can be taken as the edge users.

Therefore, it is possible to prevent the edge users of adjacent cells from using the same resources to transmit data by applying different sleep modes to the adjacent cells, i.e., turning off part of the function of the adjacent cell base stations differently, thereby reducing the interferences as much as possible and improving resources usage effectively.

As an example, the sleep mode determining unit 102 can be configured to determine a sleep mode corresponding to a level of sleep which is different from the levels of cells adjacent to the cell to be controlled, as the sleep mode for the cell to be controlled. For example, as for an adjacent cell b of the cell to be controlled a, if b has adopted the sub-frame sleep, in the case of requiring to change the operation state of a, it is possible to make a perform sub-carrier sleep, vice versa. Moreover, if not pointed out in particular, the sleep mode in the context includes the level of sleep itself.

Figure 4:
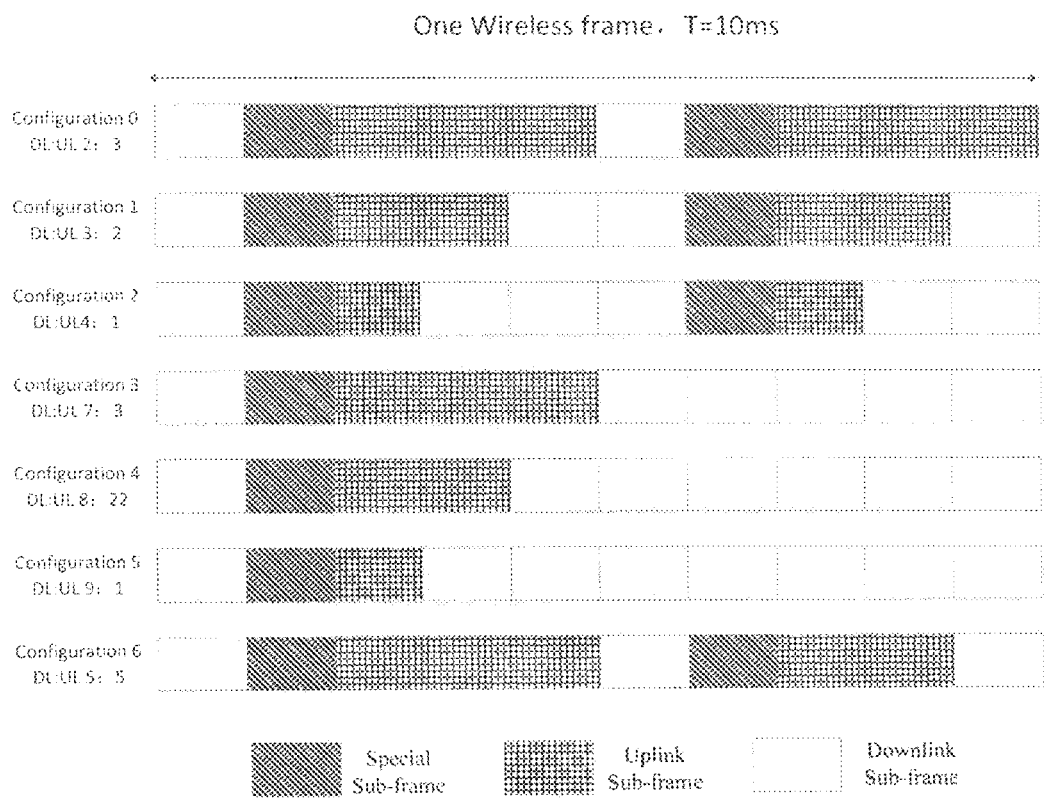
FIG. 4 is a diagram illustrating an example of unlink and downlink configuration of a wireless frame.

While with respect to the situation where there is only one level of sleep, the sleep mode determining unit 102 sets different sleep modes of the level of sleep for the cell to be controlled. For example, as for the sub-frame sleep, the sleep modes can be distinguished by setting different locations for the sleep sub-frame (also referred as silent sub-frame). FIG. 4 illustrates seven configurations of a wireless frame for uplink (UL)/downlink (DL) in a Time Division Duplexing (TDD) system, wherein, the wireless frame has a period of 10 ms, and is divided into 10 sub-frames. The grid line blocks represent uplink sub-frames, the white blocks represent downlink sub-frames, the diagonal line blocks represent special sub-frames in which the switching between uplink and downlink occurs.

Figure 5:
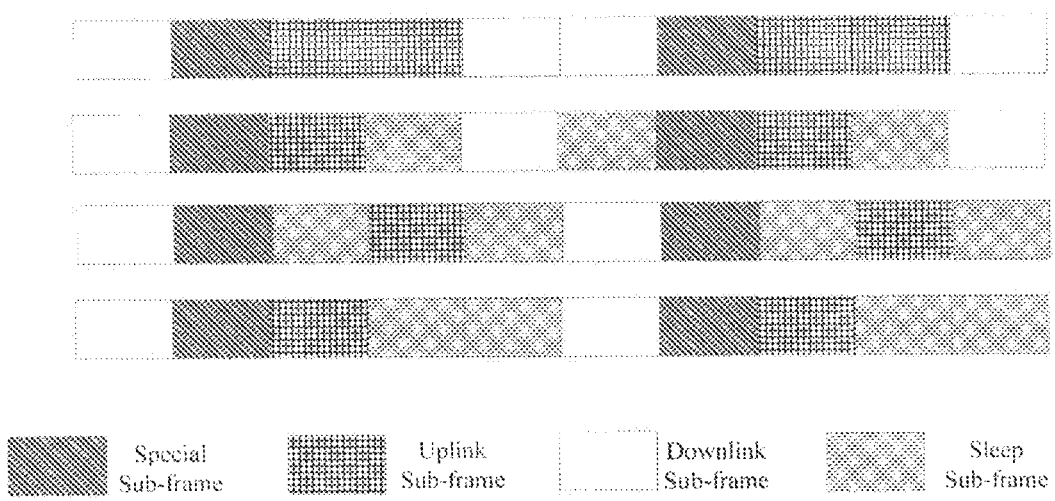
FIG. 5 is a diagram illustrating an example of a sub-frame sleep mode according to an embodiment of the present application.

As for the small cells in the same cluster, the same unlink and downlink frame configuration such as configuration 1 is generally adopted, and there can be several sleep modes shown in FIG. 5 where the dotted blocks represent the sub-frames in sleep. It can be seen that the sub-frames at different positions sleep in different sleep modes. When the adjacent small cells adopt different sleep modes, it is equivalent to using different time sections of a wireless frame to transmit data, and thus it is possible to avoid mutual interferences. Similarly, as for a macro cell, sub-frames at different positions can sleep for its related users, to avoid interferences with other macro cells or small cells.

Figure 6:
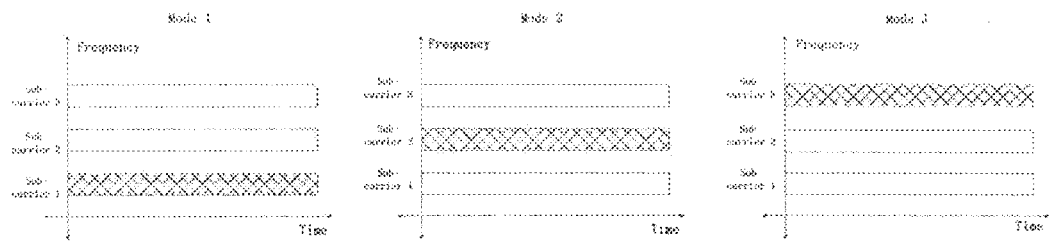
FIG. 6 is a diagram illustrating an example of a sub-carrier sleep mode according to an embodiment of the present application.

As another example, as for the sub-carrier sleep, the sleep modes can be implemented by removing related users from some sub-carriers. That is, the related users in some cell are made not to use some sub-carriers to transmit data. As shown in FIG. 6, three kinds of sub-carrier sleep modes are illustrated, wherein, the grid line blocks represent sub-carriers in sleep. Similarly, by applying different sleep modes to the adjacent cells, it is possible to enable their transmission using different sub-carriers, thereby implementing interleaving usage of the carrier frequency band and avoiding interferences. It is to be understood, the sub-carrier sleep herein can be sub-carrier downlink sleep or sub-carrier uplink and downlink sleep. In addition, it is to be understood that the above mentioned operation can be with respect to small cells as well as macro cells.

Figure 7:
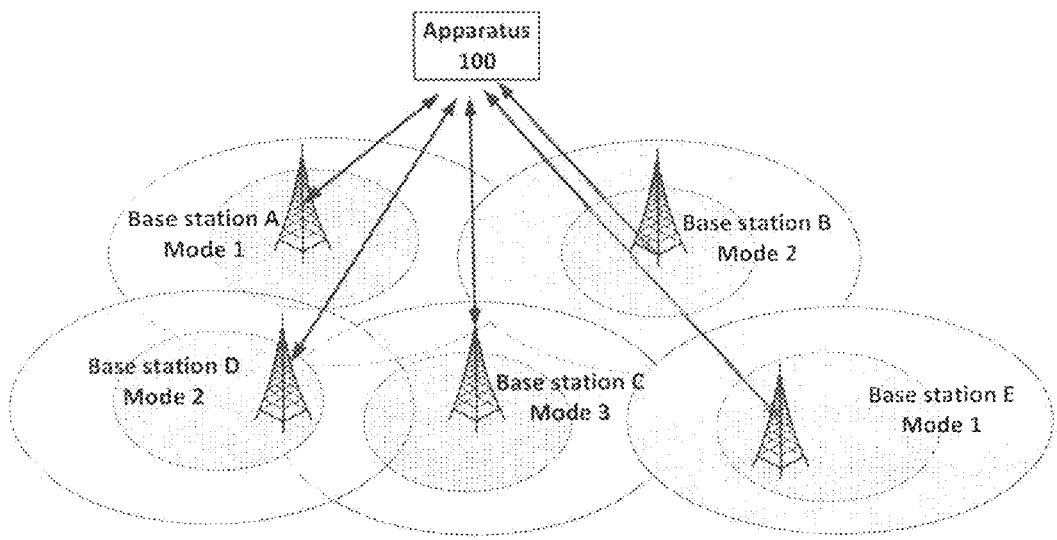
FIG. 7 is a schematic drawing illustrating allocating different sleep modes to respective cells in the control range of the apparatus 100 according to an embodiment of the present application.

FIG. 7 illustrates a schematic drawing of the apparatus 100 allocating different sleep modes shown in FIG. 5 or FIG. 6 to different cells. It can be seen that the adjacent cells have sleep modes different from each other. It is to be understood that the sleep modes here are not limited to the sub-frame sleep modes and sub-carrier sleep modes described with reference to FIG. 5 and FIG. 6, but can also include various other sleep modes.

In an embodiment, the sleep mode determining unit 102 can use the coloring method to determine the above sleep modes. The coloring method means coloring a Figure while ensuring each sub-block in the Figure has a different color from its adjacent sub-blocks in the graph theory. This can be achieved by various known algorithms, which will not be described in detail.

As an example, the sleep mode determining unit 102 is configured to determine a sleep mode corresponding to a sleep sub-frame which is different from the sleep sub-frames of cells adjacent to the cell to be controlled, as the sleep mode for the cell to be controlled, or determine a sleep mode corresponding to a sleep sub-carrier which is different from the sleep sub-carriers of cells adjacent to the cell to be controlled, as the sleep mode for the cell to be controlled.

In this situation, the sleep mode determining unit 102 can be configured, with respect to a part of users of the cell to be controlled, determine a change of operation state of this part of users to be performed by the cell to be controlled. For instance, when the cell to be controlled is a macro cell and a part of its users are subjected to relatively large interferences, the state change determining unit 101 can determine the change of operation state with respect to this part of users, such as making some sub-frames sleep for this part of users, i.e., making this part of users failing to communicate using these sub-frames. It can be understood that it's not limiting, and the cell to be controlled can also be a small cell.

Since the central users of a cell would substantially not subjected to interferences on the same frequency from adjacent cells, therefore, in some cases, the central users are not necessary to sleep, and the above mentioned sleep modes can be only applied to the edges users of the cell to be controlled. For example, in the sub-frame sleep mode, only the edge users use the wireless frame configuration mode including sleep sub-frame to communicate, while the central users still use the original frame configuration. In other words, the base station suspending usage of particular transmission resources mentioned above may be only for the edge users subjected to interferences. That is, the particular transmission resources do not serve the edge users.

The apparatus 100 can be a separate controlling apparatus, and can also be a controlling apparatus located in the base station which controls the cell to be controlled. The base station can be a base station of the small cell serving the cluster head or the macro cell, and can control multiple cells. Further, the apparatus 100 can be located in the base station of each cell, for determining the change of operation state to be performed by the cell which it is located in.

In the case that the apparatus 100 is a separate controlling apparatus or located in the base station which controls the cell to be controlled, the apparatus 100 can further include a transmitting unit, configured to transmit a control signal comprising at least a signal of the sleep mode determined by the sleep mode determining unit 101 to the cell to be controlled, so as to control it to perform the change of operation state. In such a situation, the apparatus 100 plays the role of a central controller, and manages the operation states and sleep modes when performing sleeping of multiple cells in its coverage range.

In addition, the transmitting unit can be further configured to transmit a control signal comprising at least a signal of the sleep mode determined by the sleep mode determining unit 102 to a base station controlling the cell to be controlled. Then, the base station manages the sleep modes of each cell.

<The Second Embodiment>

Figure 8:
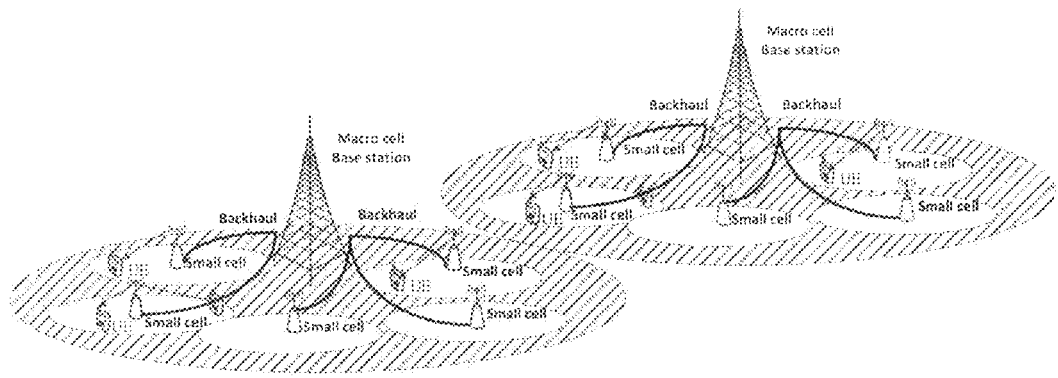
FIG. 8 is a schematic drawing illustrating an example of an application scenario including macro cells to be controlled, small cells to be controlled and their adjacent cells, and user terminals (UE) in the cells.

FIG. 8 illustrates the diagram of an example of an application scenario including a macro cell to be controlled, a small cell to be controlled and the adjacent cells thereof, as well as the user terminals (UEs) in the cell. It is to be understood that FIG. 8 is only an example for the purpose of facilitating the understanding of the present application, and the scenarios where the present invention can be applied are not limited thereto.

As stated above, the state change determining unit 102 can determine the change of operation state to be performed by the cell to be controlled according to a certain criterion or factor. The criterion herein includes various suitable evaluation manners which are known or may be used in the future. Several non-limiting examples of the determining criteria will be described below.

Figure 9:
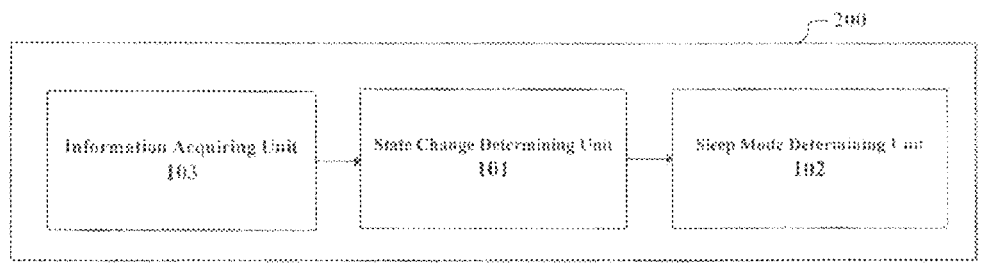
FIG. 9 is a structural block diagram of the apparatus for controlling a change of operation state of a cell according to another embodiment of the present application.

FIG. 9 illustrates another example of the apparatus 200 for controlling the change of operation state of the cell. Various specific manners for the state change determining unit 101 to perform operations will be described below with reference to FIG. 9, which, however, are necessarily exemplary but not limiting.

Determination Based on User Communication Characteristics

As shown in FIG. 9, besides each of the components in apparatus 100, the apparatus 200 further includes an information acquiring unit 103, configured to acquire communication characteristics of a user of the cell to be controlled, wherein, the state change determining unit is configured to determine the change of operation state to be performed at least based on the communication characteristics.

As stated above, since mutual interferences tend to occur between the edge users of adjacent cells, therefore, the communication quality of the edge users directly reflects the extent of this cell having to sleep. Thus, in an example, the state change determining unit 101 can determine the change of operation state to be performed at least based on the communication characteristics of the edge users of the cell to be controlled. Generally, when the communication characteristics degrade, it is necessary to increase the level of sleep of the cell to be controlled.

The communication characteristics include at least one of the following parameters: the signal to interferences plus noise ratio (SINR) of the user, the retransmission probability of the user. The parameters can be detected by the apparatus 200 by itself, and can also be reported by the base station of the cell to be controlled.

For example, the state change determining unit 101 determines the change of operation state to be performed when at least one of the following conditions is met: the SINR of the user is lower than a predetermined threshold, and the retransmission probability of the user is higher than a predetermined probability. This is because these conditions mean that the degradation of the communication characteristics of the user exceeds an allowable extent.

Referring to FIG. 3, for example, the current cell is in active state, and when it is detected that the user's SINR is lower than a first threshold P1, the state change determining unit 101 determines to increase its level of sleep by one level. That is, the level of sleep becomes the sub-frame sleep state. When it is detected that the SINR of the user is lower than a second threshold P2 which is lower than the first threshold P1, the state change determining unit 101 determines to increase the level of sleep by two levels. That is, the level of sleep becomes the sub-carrier downlink sleep state. Of course, the number of levels of sleep to be increased or decreased can be determined according to an extent to which the SINR exceeds or is lower than a certain threshold. It is to be noted that description is made here only with SINR as an example, and as for other conditions, similar settings can be provided. Further, the change of level of sleep is not limited to the above mentioned manner.

In addition, the change of operation state to be performed can also be determined based on the traffic amount of the user. For example, when the traffic amount is lower than a predetermined value, it means the cell is in a relatively vacant state, and thus it is possible to increase its level of sleep so as to reduce energy consumption. More detailed description will be made with respect to the determination based on such a factor in the latter "Determination based on load" part.

Further, although the communication characteristics of users are used in the above, it is also possible to use only the communication characteristics of edge users in order to increase efficiency, because the edge users generally tend to be interfered by other cells.

Determination Based on Interferences

Figure 1:
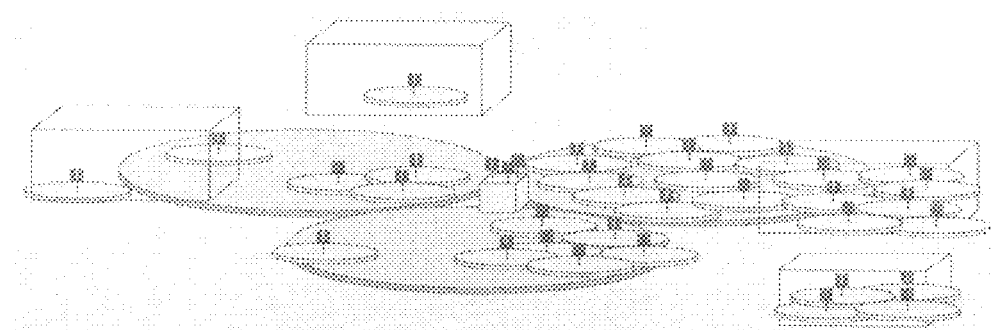
FIG. 1 is a schematic drawing illustrating the space distribution in an example of the application scenario including macro cells and small cells.

In the cell distribution scenario including multiple cells shown in FIG. 1, one of the cells may produce interferences to other adjacent cells, and the apparatus 200 can further determine the change of operation state of this cell to be performed based on the degree of the interferences. In this example, the information acquiring unit 103 is configured to acquire the interference between the cell to be controlled and the adjacent cells.

Specifically, the information acquiring unit 103 is configured to acquire a number of high-interference user terminals (UEs) in the adjacent cell to determine a degree of interferences the cell to be controlled produced to the adjacent cell, wherein, the interferences the high-interference user terminal being subjected to from the cell to be controlled exceed a predetermined limit. Herein, the number of high-interference UEs can be directly used as the value of the degree of interferences. Alternatively, it is also possible to map the different numbers of the high-interference UEs to respective level of degree of interferences.

Here, the information acquiring unit 103 can detect the number of high-interference UEs by itself, or receive the report about this number from the base station of the cell to be controlled.

In one embodiment, the information acquiring unit 103 can determine whether a UE in an adjacent cell is a high-interference UE based on an uplink signal of the user terminal received by the cell to be controlled. The uplink signal here includes but is not limited to uplink detection signal SRS, PRACH and uplink control or data signal PUSCH/PUCCH. It is to be understood that the function of the information acquiring unit 103 can be integrated into the apparatus 200 serving as a controller, and can also be distributed among each cell base station. That is, each base station makes decisions for the high-interference UEs and report the decision result to the apparatus 200.

Figure 10:
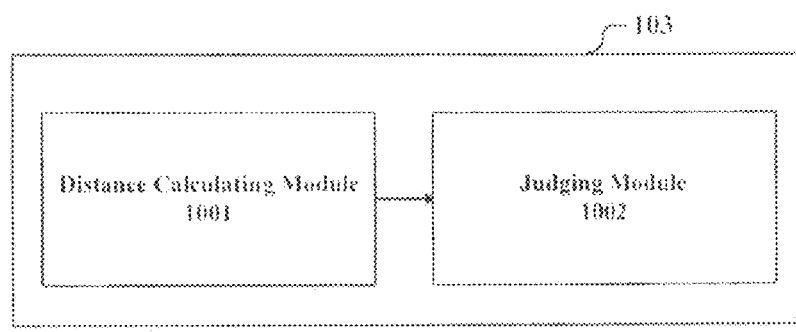
FIG. 10 is a structural block diagram of the information acquiring unit according to an embodiment of the present application.

FIG. 10 illustrates a block diagram of an example of the structure of the information acquiring unit 103. As shown in FIG. 10, the information acquiring unit 103 includes: a distance calculating module 1001, configured to calculate a distance from the UE in an adjacent cell to a base station of the cell to be controlled; and a judging module 1002, configured to judge the UE to be a high-interference UE, in the case that power of the uplink signal is higher than a first predetermined threshold, the distance is smaller than a second predetermined threshold, and the cell to be controlled makes use of the same frequency spectral resources as the UE does.

Figure 11:
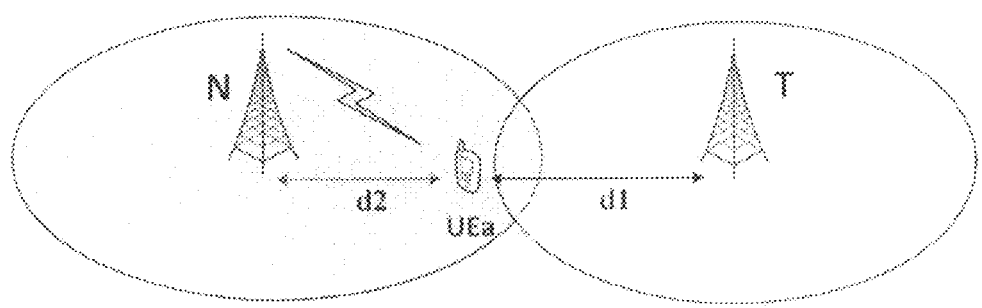
FIG. 11 is a diagram illustrating an example for calculating the distance d1 between the user terminal UEa and the base station T of the cell to be controlled.

FIG. 11 illustrates an example for calculating the distance d1 between the user terminal UEa and the base station T of the cell to be controlled. The UEa is a user of the adjacent cell base station N, and the distance to the base station N is d2.

When using the uplink signal SRS or PRACH, the distance calculating module 1001 is configured to calculate an uplink time advance (TA) from the UE to the base station of the cell to be controlled based on the SRS or PRACH signal, and estimate the distance according to this TA. For example, in the example of FIG. 11, the distance d1 is calculated to be 500 m.

If the distance d1 is smaller than the second predetermined threshold (such as 800 m), the uplink signal SRS or PRACH has a power higher than the first predetermined threshold, and the cell to be controlled T uses the same frequency spectral resources as the UEa does, it is evaluated that the UEa transmitting the uplink signal is subjected to strong interferences, and thus the judging module 1002 judges the UEa as a high-interference UE.

Alternatively, when using the uplink signal PUSCH or PUCCH, the distance calculating module 1001 is configured to acquire an uplink TA of the UE from the base station of its served cell, add this TA with a time deviation between a timing the cell to be controlled detects the PUSCH/PUCCH and an uplink synchronization timing, and take the obtained sum as an uplink TA from the UE to the base station of the cell to be controlled, so as to estimate the distance according to this TA.

Figure 12:
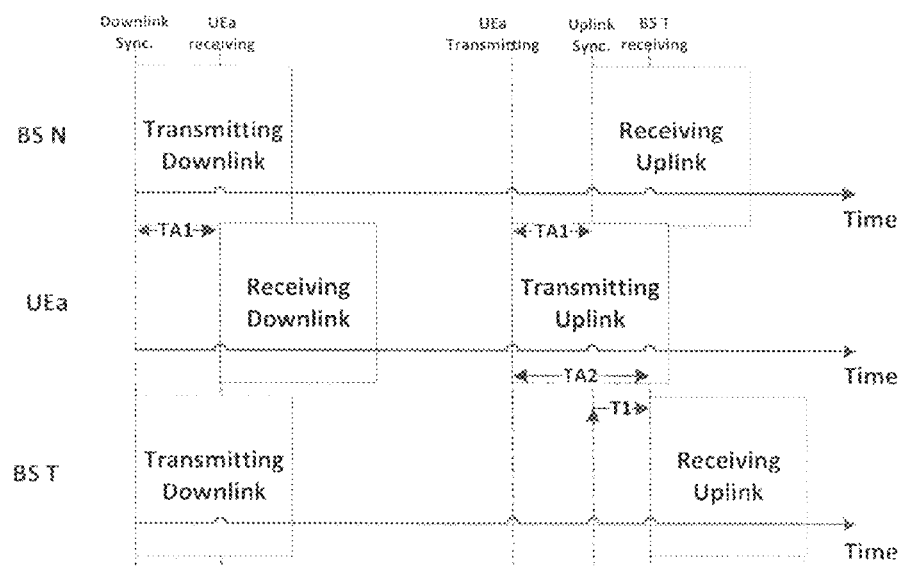
FIG. 12 shows an schematic timing chart for the signal transmitting and receiving among the cell base stations T, N in FIG. 11 and the user terminal UEa.

Taking FIG. 11 as an example, FIG. 12 illustrates the timing chart for the signal transmitting and receiving among the cell base stations T, N and the user terminal UEa. The uplink time advance of UEa is TA1, and it can be calculated that the distance d2 from UEa to the base station N is 300 m from TA1. The time for the uplink signal PUSCH or PUCCH arriving at the base station N is exactly the uplink synchronization timing. The base station T and base station N are synchronized, and the arriving timing of the uplink signal of UEa detected by the base station N is time deviated from the uplink synchronization timing, the time deviation being denoted by T1. As shown in FIG. 12, TA2=TA1+T1, TA2 being the uplink time advance from the user terminal UEa to the base station T, from which it can be calculated that the distance d1 from the UEa to the base station T is 500 m.

Similarly, if the distance d1 is smaller that the second predetermined threshold (such as 800 m), the power of the uplink signal PUSCH or PUCCH is higher than the first predetermined threshold, and the cell to be controlled T uses the same frequency spectral resources as the user terminal UEa does, it is evaluated that the UEa transmitting the uplink signal is subjected to strong interferences, and thus the judging module 1002 judges the UEa as a high-interference UE.

The above mentioned first predetermined threshold and the second predetermined threshold can be determined according to empirical value or by experiment.

Although two methods for determining the distance from the user terminal to the base station of the cell to be controlled are shown above, the method for determining the distance is not limited thereto, and various other manners can be adopted. For example, determination can be made based on the position information of Global Positioning System (GPS), or based on the location information of base stations. Since the two methods for determining are known to those skilled in the art, they are omitted here.

In addition, the method for determining the distance from the user terminal to the base station of the cell to be controlled based on PUSCH or PUCCCH signal and TA of the user terminal described as an example above can be applied to various situations requiring to measure a distance, but not limited to the embodiment specifically described in the application. For example, this method can be used in the previous operation for judging edge uses.

In another example, the information acquiring unit 103 can be further configured to acquire a degree of interference the cell to be controlled produced to the adjacent cell, which is indicated by at least one of signals of OI (overload indication), HII (high interference indication) and RNTP (relative narrowband transmitting power) from the adjacent cell.

That is, the information acquiring unit 103 can acquire the interference indicating signal, i.e., the inter-cell interference coordination signal such as OI, HII or RNTP of the X2 interface, to indicate the degree of interference the cell to be controlled produced to the adjacent cell, or receive the degree of interference directly from the base station of the cell to be controlled. For example, the OI, HII or RNTP signal sent to the cell to be controlled by the adjacent cell via a feedback channel (such as the X2 interface) indicates that more than 70% of the resources blocks are seriously interfered.

When the information acquiring unit 103 acquires the above mentioned degree of interference, the state change determining unit 101 determines whether to increase or decrease the level of sleep of the cell to be controlled by one or more levels based on the degree of interference, the levels to be increased or decreased being determined according to the degree of interference.

In one example, the state change determining unit 101 can be configured to compare the degree of interference with a first threshold or a second threshold which is lower than the first threshold, and when the degree of interference is higher than the first threshold, the state change determining unit 101 determines to increase the level of sleep of the cell to be controlled by one or more levels, and when the degree of interference is lower than the second threshold, the state change determining unit 101 determines to decrease the level of sleep of the cell to be controlled by one or more levels.

For example, when the degree of interference is higher than the first threshold by more than a limit A, it is to increase the level of sleep by one level, and when the degree of interference is higher than the first threshold by more than a limit B (B>A), it is to increase the level of sleep by two levels, and so on. Likewise, for example, when the degree of interference is lower than the second threshold by more than a limit C, it is to decrease the level of sleep by one level, and when the degree of interference is lower than the second threshold by more than a limit D (D<C), it is to decrease the level of sleep by two levels, and so on.

In addition, it is also possible to establish the correspondence between the degree of interference and the level of sleep. In other words, for example, when the degree of interference is within a first range, the cell enters into "the sub-carrier sleep", and when the degree of interference is within a second range, the cell enters into "the sub-frame sleep", etc., and so on.

In the above, the situation where the information of degree of interference the cell to be controlled produced to the adjacent cell is described. Since the interferences are mutual, the information acquiring unit 103 can also acquire information of the degree of interference the adjacent produced to the cell to be controlled. For example, in the case of the user terminal UEa being a high interference UE of the base station of the cell to be controlled T, the information that the user terminal UEa of the adjacent cell base station N produces high interference to the base station T is acquired correspondingly in the meantime. For example, the above information can be acquired for each cell base station and be collected in the apparatus 200 serving as a controller, so as to obtain a list of a high-interference UE, the base station it belongs to and the base stations being interfered by it. This list can be stored in the apparatus 200, and can also be stored in a separate database. Based on this list, cells producing high interferences to other cells such as cells whose user terminals produce high interference to multiple cell base stations can be searched, and/or cells subjected to high interferences from other cells such as cells whose user terminals are high interference UEs of multiple adjacent cells can be searched, so that the state change determining unit 101 increase the level of sleep of these cells according to the searching result. Specific examples of this list and its application will be described in detail later with reference to FIGS. 26-27.

Determination Based on Load

Further, the information acquiring unit 103 can be configured to acquire load of the cell to be controlled or load to be shunted by other cells to the cell to be controlled, wherein, the state change determining unit 101 can determine the change of operation state to be performed by the cell to be controlled based on the load. Similarly, the information acquiring unit 103 can detect the above mentioned load by itself, and can also receive the report about the load from respective cell base station.

To be noted, although not pointed out explicitly, the information acquiring unit 103 can further have the configuration described in the first embodiment. At this time, the state change determining unit 101 can determine the change of operation state to be performed by the cell to be controlled based on the acquired interference and/or load. In other words, the determination can be made based individually on the interference or individually on the load, and can also be made based on both the interference and the load.

When there are two factors of interference and load, it can be determined whether to increase or decrease the level of sleep of the cell to be controlled by one or more levels based on the interference and the load. If the changing trends of the operation state determined based on the interference and the load respectively are identical, according to an example of the invention, it can follow the one for which the determined degree of change of the level of sleep is larger. For example, if the level of sleep of the cell to be controlled should be increased by 2 levels based on the load, and the level of sleep of the cell to be controlled should be increased by 3 levels based on the interference, it is determined that the level of sleep of the cell to be controlled is to be increased by 3 levels. If the changing trends of the operation state determined based on the interference and the load are opposite, in a preferred example of the invention, the decision based on the load can be followed. Furthermore, it is also possible to perform adjustment based on the conditions of the interference on the basis of the decision made according to the load. For example, if the level of sleep of the cell to be controlled should be decreased by 2 levels based on the load, and the level of sleep of the cell to be controlled should be increased by 1 level based on the interference, it is determined that the level of sleep of the cell to be controlled is to be decreased by only one level.

In an example, the information acquiring unit 103 is configured to acquire load of the cell to be controlled within a predetermined time period, and the state change determining unit 101 is configured to determine whether to increase or decrease the level of sleep of the cell to be controlled by one or more levels based on the load, wherein, the number of levels to be decreased or increased is determined according to the conditions of the load. For example, when the load is higher than a first limit of load, the level of sleep is decreased by 1 level, and when the load is higher than a second limit of load, the level of sleep is decreased by 2 levels, and so on, vice versa.

The load herein can be the traffic amount mentioned previously, i.e., the data amount transmitted within a predetermined time period, and can be acquired by monitoring the data amount in the buffer of the base station and the user terminal.

In addition, the information acquiring unit 103 can be configured to acquire a number of user terminals with high signal-to-noise ratio (SNR) which are served by the cell to be controlled within the predetermined time period so as to determined the load, wherein, the user terminals with high signal-to-noise ratio are the following ones: the signal-to-noise ratio of an uplink signal which a base station of the cell to be controlled received from the user terminal exceeds a predetermined threshold.

The uplink signal can be SRS or PRACH signal. Here, the user terminals with high SNR mean the important load of the base station of the cell. Therefore, it is possible to scale the load conditions of the cell base station according to the number of the user terminals with high SNR. If the number is larger, it implies that the load of the cell is higher and it is necessary to decrease the level of sleep thereof. It is possible to directly set the level of sleep to be changed to according to the number, or determine the number of levels to be changed according to the extent the number exceeding a predetermined value.

In another example, the information acquiring unit 103 is configured to acquire user terminals or carriers to be shunted to the cell to be controlled from other cells as the load to be shunted, and the state change determining unit 101 is configured to decrease the level of sleep of the cell to be controlled by one or more levels when the load to be shunted exceeds a predetermined amount, and the number of levels to be decreased depends on the amount of the load to be shunted.

The "other cells" include both other small cells and macro cells. The macro cell detects the using ratio of PDSCH resources in several carriers thereof. If the using ratio of PDSCH resources in a certain carrier exceeds a predetermined percentage, such a carrier is a carrier to be shunted. That is, the users in the coverage range of the cell to be controlled which use this carrier to communicate can be shunted to the cell to be controlled. Therefore, the information acquiring unit 103 can be configured to acquire the number of carriers to be shunted of the macro cell which cover the cell to be controlled, and when the number exceeds a predetermined value, the state change determining unit 101 can determine to decrease the level of sleep of the cell to be controlled by one or more levels, because the cells covered by more carriers to be shunted of the macro cell can shunt the load of the macro cell more effectively.

Specifically, the macro cell can transmit a reference signal on each carrier to be shunted, so that the cell to be controlled can detect the number of received carriers to be shunted by this reference signal.

Figure 13:
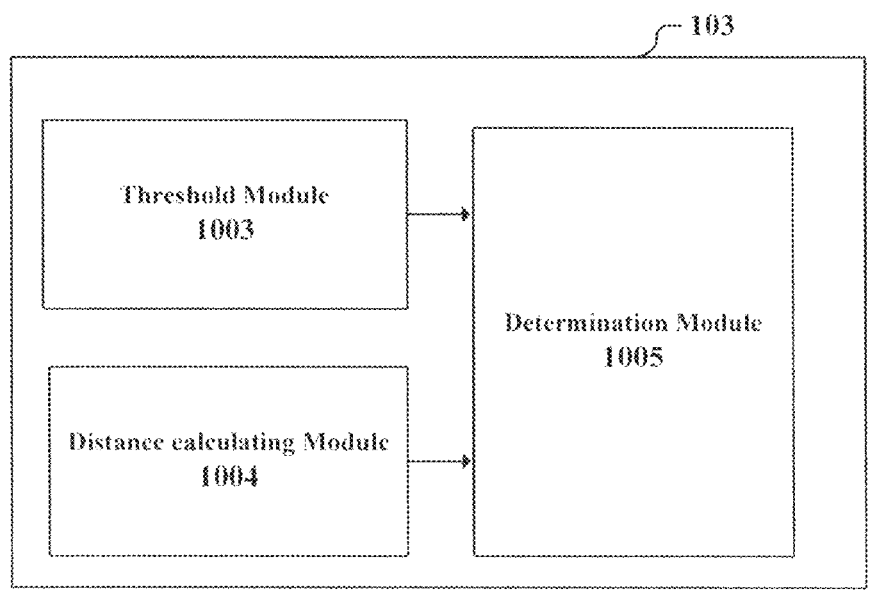
FIG. 13 is a structural block diagram of the information acquiring unit according to another embodiment of the present application.

FIG. 13 illustrates a structural block diagram of another example of the information acquiring unit 103. As shown in FIG. 13, the information acquiring unit 103 includes: a threshold module 1003, configured to judge whether an intensity of the uplink signal from the user terminal of the other cells exceeds a predetermined range; a distance calculating module 1004, configured to calculate a distance from the user terminal to a base station of the cell to be controlled in the case that the intensity of the signal exceeds the predetermined range; and a determination module 1005, configured to determine the user terminal to be the load to be shunted in the case that the distance is shorter than a predetermined distance.

The uplink signal can be SRS, PRACH signal or PUSCH, PUCCH signal. The distance calculating module 1004 can perform calculation in the same way as that of the distance calculating module 1001 described above with reference to FIG. 10 to FIG. 12, which will be omitted here. Further, it is to be noted that although FIG. 13 only illustrates the threshold module 1003, the distance calculating module 1004 and the determination module 1005 for determining the load to be shunted, it can also includes the distance calculating module 1001 and the judging module 1002 for judging a high-interference user terminal shown in FIG. 10. Moreover, the output results of the determination module 1005 and the judging module 1002 can also be adopted correspondingly in accordance with the principle for changing the level of sleep in the case of considering both factors of interference and load as stated above according to requirement.

Figure 14:
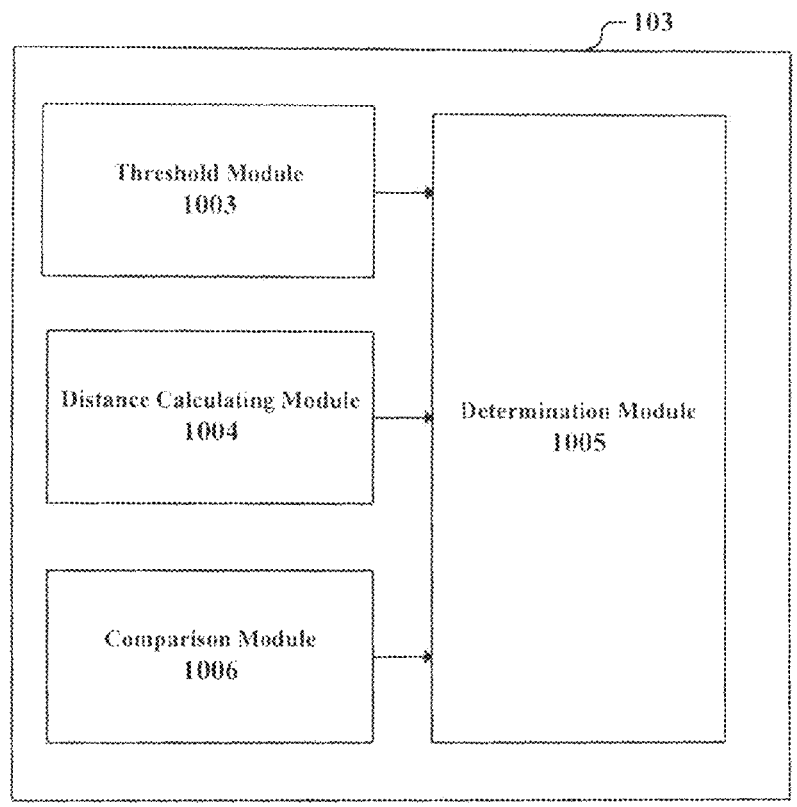
FIG. 14 is a structural block diagram of the information acquiring unit according to still another embodiment of the present application.

Further, FIG. 14 illustrates a structural block diagram of another example of the information acquiring unit 103. Besides each of the modules in FIG. 13, the information acquiring unit 103 further includes a comparison module 1006, configured to compare signal power detected by the cell to be controlled from the user terminal and signal power detected by the other cells from the user terminal, and the determination module 1005 is further configured to determine the user terminal to be the load to be shunted in the case that the signal power detected by the cell to be controlled is higher than the signal power detected by the other cells.

In addition, in the case of storing the list of a high-interference UE, the base station it belongs to and the base stations being interfered by it as stated above, cells producing high interferences to other cells are searched. It can be understood that after increasing the level of sleep of such a cell, the adjacent cells interfered by it most (for example, with the most high-interference UEs) would become the preferred destination for shunting to which the base station of the cell release load. Therefore, when the decision of increasing the level of sleep of the cell is made, it is possible to pre-estimate the load to be shunted to the adjacent cell base station according to the decision, and thus determine to decrease the level of sleep of the adjacent cell simultaneously.

As described above, in the above example, besides the interference with the adjacent cells, it is also possible to determine the change of operation state to be performed according to the load conditions of the cell to be controlled, or it is possible to make the determination based individually on the load conditions of the cell to be controlled.

<The Third Embodiment>

In the above embodiments, the apparatus 100 or 200 takes the change of operation state of only one cell to be controlled into consideration. In the following, an example of how to process under the condition of there being multiple cells to be controlled whose operation state is to be changed will be described with reference to FIG. 15 and FIG. 16.

Figure 15:
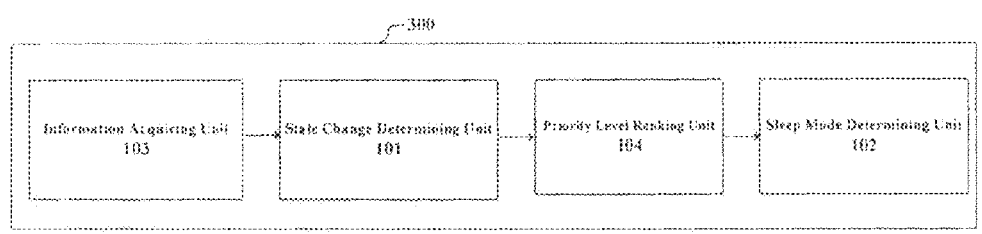
FIG. 15 is a structural block diagram of the apparatus for controlling a change of operation state of a cell according to another embodiment of the present application.

FIG. 15 illustrates a structural block diagram of the apparatus 300 for controlling a change of operation state of a cell according to another embodiment of the present application. As shown in FIG. 15, besides the state change determining unit 101, the sleep mode determining unit 102 and the information acquiring unit 103 described with reference to FIG. 9, the apparatus 300 further includes a priority level ranking unit 104, configured to rank, in the case that it is determined there are multiple cells to be controlled whose operation states are to be changed by the state change determining unit 101, priority levels for changing their states. In addition, although not shown in FIG. 15, the apparatus 300 can further include a transmitting unit.

The priority level ranking unit 104 can be configured to rank in accordance with the load, interference or the like of each cell to be controlled.

Specifically, in one example, the priority level ranking unit 104 is configured to rank in accordance with the load of each cell to be controlled or the load to be taken over by each cell to be controlled which is shunted by other cells, wherein, the smaller the load is, the higher the priority level of increasing the level of sleep of this cell to be controlled is, and the larger the load is, the higher the priority level of decreasing the level of sleep of this cell to be controlled is.

The load can include the number of users with high signal to noise ratio, the number of user terminals to be shunted or the number of carriers to be shunted as described in the second embodiment and so on, and will not be repeated here. For example, the cells to be controlled can be ranked according to the size of respective load, so as to obtain the priority level rank for changing the level of sleep of the cells to be controlled.

In addition, the priority level ranking unit 104 can be configured to rank in accordance with a degree of interference between each cell to be controlled and its adjacent cells, wherein, the higher the degree of interference is, the higher the priority level of increasing the level of sleep of this cell to be controlled is, and the lower the degree of interference is, the higher the priority level of decreasing the level of sleep of this cell to be controlled is. The interference here includes at least one aspect of the interference the cell to be controlled produced to the adjacent cell and the interference the adjacent cell produced to the cell to be controlled.

The degree of interference can include the degree of interference indicated by the number of high-interference user terminals, OI, HII, or RNTP signal as described in the second embodiment, and will not be repeated here.

As for a small cell, the priority level ranking unit 104 can further be configured to rank in accordance with a feedback bandwidth or a transmission delay between each small cell to be controlled and a macro cell, wherein, the larger the feedback bandwidth is or the smaller the transmission delay is, the higher the priority level of decreasing the level of sleep of this small cell to be controlled is, and the smaller the feedback bandwidth is or the larger the transmission delay is, the higher the priority level of increasing the level of sleep of this cell to be controlled is.

This configuration is based on the idea of firstly choosing base stations with higher feedback rate or smaller transmission delay to operate. Specifically, if the feedback bandwidth between the small cells and the macro cell can be known when establishing the networks initially, the priority level ranking is set according to the ranking of the feedback bandwidth. Otherwise, each small cell transmits signal to the macro cell while requesting reply, and the time interval between transmitting the signal and receiving the reply represents the transmission delay. The priority level ranking is set according to the ranking of the delay.

In addition, the priority level ranking unit 104 can further be configured to rank in accordance with a number of user terminals which use the carrier of each small cell to be controlled as the primary component carrier (PCC) and a number of user terminals with double connections of connecting a base station of a macro cell and the small cell to be controlled, wherein, the more the number of user terminals which use the carrier of each small cell to be controlled as the primary component carrier is, the lower the priority level of increasing the level of sleep of this small cell to be controlled is, and the more the number of user terminals with double connections is, the higher the priority level of increasing the level of sleep of this small cell to be controlled is.

In other words, the larger the number of users using the carrier of the small cell to be controlled as the PCC is, the lower the priority level of making the carrier sleep is. For example, when the number of users exceeds a certain amount, this carrier of the cell base station is not allowed to sleep.

On the other hand, if the number of users within the small cell to be controlled connecting the base station of the macro cell and the base station thereof is large, it is possible to consider increasing its level of sleep preferably.

As another example, the priority level ranking unit 104 can further be configured to rank in accordance with the communication characteristics of users of each cell to be controlled such as the average SINR of the users and/or the average retransmitting probability of the users. The lower the average SINR is, the higher the priority level of increasing the level of sleep of the cell to be controlled is, and the higher the average retransmitting probability is, the higher the priority level of increasing the level of sleep thereof is.

By incorporating the priority level ranking unit 104, in the case of there being multiple cells to be controlled whose level of sleep is to be changed, it is possible to perform operation by preferably choosing the cells to be controlled whose level of sleep is most required to be changed according to a certain strategy.

In addition, the result of the priority level ranking can also be used in determining cells who have priority in determining sleep mode. For example, a first cell with the highest priority level is first chosen to determine its sleep mode, and then a sleep mode is selected for a second cell with the second highest level of sleep. If the second cell is adjacent to the first cell, a different sleep mode from that of the first cell would be determined for the second cell, and so on. When the sub-frame is to be performed and it is to determine the sleep mode for the first cell, it is possible to acquire a sub-frame of the cell subjected to the most serious interferences and choose a sleep mode with such a sub-frame being silent.

Figures 16, 17:
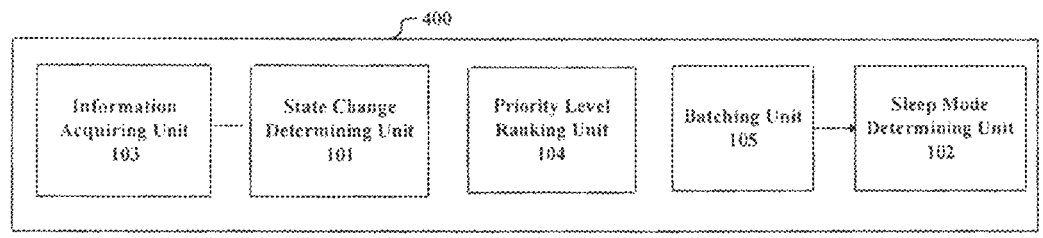
FIG. 16 is a structural block diagram of the apparatus for controlling a change of operation state of a cell according to still another embodiment of the present application.
FIG. 17 shows an example of the format of the control signal including the sleep mode according to an embodiment of the present application.

FIG. 16 illustrates a structural block diagram of the apparatus 400 for controlling a change of operation state of a cell according to another embodiment of the present application. As shown in FIG. 16, besides the respective units described with reference to FIG. 15, the apparatus 400 further includes a batching unit 105, configured to change the operation state of each cell to be controlled in batches according to the ranking acquired by the priority level ranking unit 104, wherein, each unit in said apparatus 400 re-perform corresponding operations after the operations states of each batch of the cells to be controlled are changed.

For example, when the state change determining unit 101 determines there are several such as 50 cell base stations to increase one level of sleep thereof, and priority level ranking is performed with respect to these 50 cell base stations in accordance with the number of high-interference UEs, for example, the sleep mode determining unit 102 can first determine the sleep modes for the first batch of 10 cell base stations, i.e., the 10 cell base stations with the largest number of high-interference UEs, and then transmit a control signal. Thereafter, detecting, ranking and transmitting signals correspondingly are performed again. The operations cycle, until no cell base stations requiring changing the level of sleep thereof exist.

After the state change determining unit 101 determines the change of level of sleep to be performed, the sleep mode determining unit 102 determines the sleep mode for the cell to be controlled based on the changed level of sleep, so that the adjacent cells have different sleep modes. If the apparatus 200 is located within the base station of a cell to be controlled, the base station performs change of operation state based on the determined sleep mode. If the apparatus 200 is a controlling apparatus for controlling multiple cell base stations, corresponding control signals can be transmitted to corresponding cells to be controlled via a transmitting unit in the apparatus 200, so as to control the cell to change the operation state thereof.

In the above respective embodiment, the apparatus 100, 200, 300 or 400 transmits a control signal including at least the sleep mode to the small cell or macro cell to be controlled. Therefore, the format of the control signal can be determined at least based on the number of the sleep modes.

Referring back to FIG. 5 and FIG. 6, in the case of there being 3 sub-frame sleep modes and 3 sub-carrier sleep modes, for example, the control signal shown in FIG. 17 can be adopted, which occupies 3 bits. It can be understood that when the number of sleep modes increases, the number of bits can be increased correspondingly.

Further, the control signal in FIG. 17 can also be interpreted as the first bit being corresponding to the level of sleep to be changed to, wherein, 0 represents the sub-frame sleep and 1 represents the sub-carrier sleep. The latter two bits represent the corresponding sleep mode in this level of sleep. When the levels of sleep become more, the bit numbers representing the level of sleep can be increased correspondingly. Considering N bits binary data can indicate $2^N$ states at most, in the case of setting 6 levels of sleep, N can be 3. For example, 000, 001, 010, 011, 100 and 110 can be distributed to the six levels of sleep described with reference to FIG. 3 respectively. Those skilled in the art can understand, various formats of control signal can be adopted, as long as the sleep mode can be distinguished uniquely.

In addition, when the first bit represents the level of sleep, it is also possible to define that this binary data indicates to increase or decrease the level of sleep by one level. For example, 0 represents increasing by one level, and 1 represents decreasing by one level.

<The Fourth Embodiment>

Figure 18:
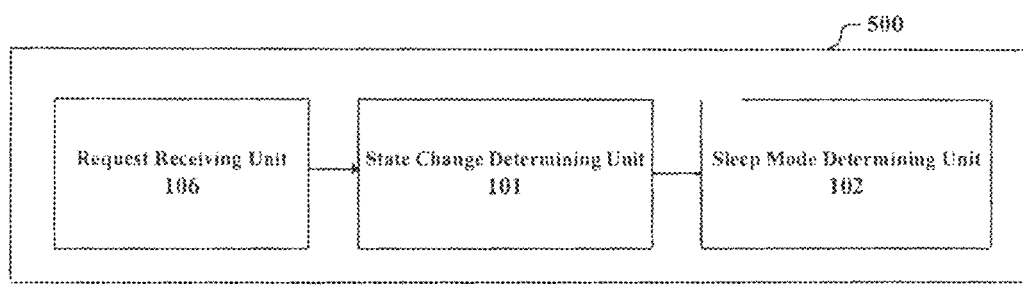
FIG. 18 is a structural block diagram of the apparatus for controlling a change of operation state of a cell according to another embodiment of the present application.

FIG. 18 illustrates a structural block diagram of the apparatus 500 for controlling a change of operation state of a cell according to still another embodiment of the present application. Besides the units described with reference to FIG. 2, the apparatus 500 further includes a request receiving unit 106, configured to receive, from the cell to be controlled, a signal requesting to change the operation state thereof, wherein, the state change determining unit 101 determines the change of operation state to be performed by the cell to be controlled in response to the signal. It is to be understood, although not shown in FIG. 18, the apparatus 500 can further include the other units described in the second the third embodiment as well as the transmitting unit.

In the first embodiment to the third embodiment, the apparatus 100, 200, 300 and 400 can command a cell to change its sleep mode. That is, the apparatus 100, 200, 300 or 400 explores the cells within its managing range on its own to determine whether there is a cell to change its level of sleep. If it determines there is such a cell, that is, the state change determining unit 101 determines to perform the change of operation state, the sleep mode determining unit 102 determines the sleep mode for this cell, and can transmit a control signal to the related cell via the transmitting unit to command it change the sleep mode.

However, in this embodiment, it is the cell who requests to change the level of sleep of itself. For example, the cell can acquire the communication characteristics of the users of itself, or acquire the interference and load conditions related to itself, and determine whether it is necessary to change the level of sleep.

For example, the cell base station is provided with the apparatus 100, 200, 300 or 400. if the cell considers it is necessary to change the level of sleep, it transmits the request signal to the apparatus 500. Preferably, the request signal contains suggestion of adjusting the level of sleep or sleep mode, the relevant communication quality, interference or load conditions. After the apparatus 500 receives the request signal via the request receiving unit 106, it acquires the control signal as stated in the above first embodiment to the third embodiment, and transmits the control signal to the above mentioned cell via the transmitting unit.

Generally speaking, the apparatus 500 can be a separate controlling apparatus, and can also be located in a base station controlling the cell to be controlled, which controls multiple cells.

It is to be understood that, although the apparatus 100-500 controls the change of operation state of a cell (including the small cell and the macro cell) in the description of the first embodiment to the fifth embodiment, it can also control the change of operation state of only the small cells but does not involve the processing of operation state of the macro cells.

<The Fifth Embodiment>

The structure and function of the apparatus for controlling the change of operation state of a cell have been described above. The configuration of the apparatus for changing operation state of the cell on the cell side will be described with reference to FIG. 19 to FIG. 21 below.

Figure 19:
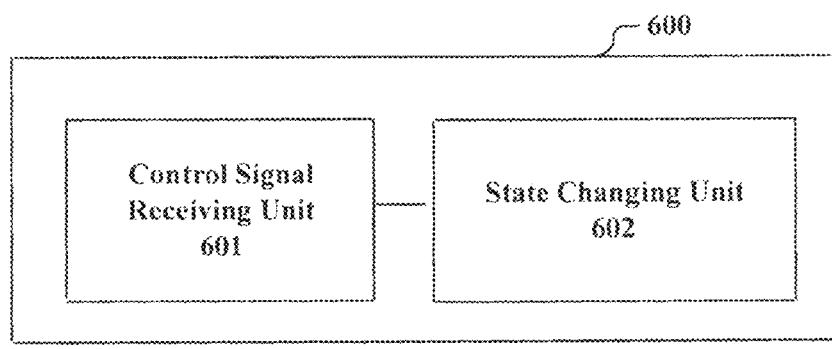
FIG. 19 is a structural block diagram of the apparatus for changing operation state of a cell according to an embodiment of the present application.

As shown in FIG. 19, the apparatus 600 for changing operation state of a cell according to an embodiment of the present application includes: a control signal receiving unit 601, configured to receive a control signal from the above mentioned apparatus (any one of the apparatus 100 to 500, referred as the controlling apparatus in the following) for controlling the change of operation state of a cell; and the state changing unit 602, configured to change the operation state of the cell based on the control signal.

The implementation scheme of the control signal has been described in particular in the third embodiment, and will not be repeated here. The state changing unit 602 changes the operation state of the cell by adopting the specified sleep pattern according to this control signal.

<The Sixth Embodiment>

Figure 20:
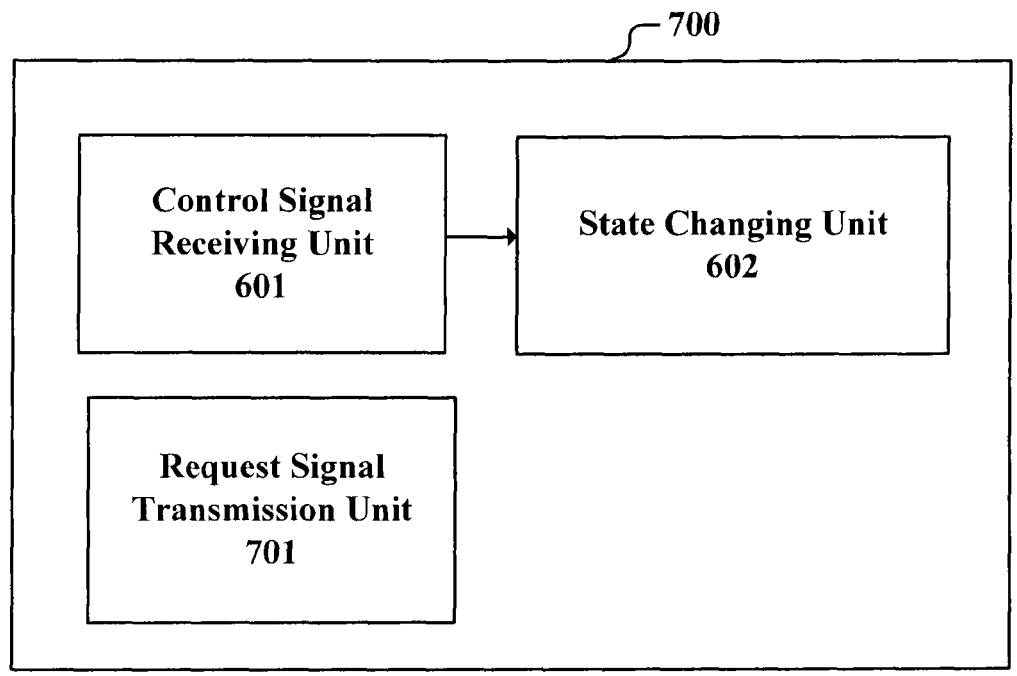
FIG. 20 is a structural block diagram of the apparatus for changing operation state of a cell according to another embodiment of the present application.

As shown in FIG. 20, besides the units in apparatus 600 described in the fifth embodiment with reference to FIG. 19, the apparatus 700 for changing operation state of a cell according to another embodiment of the present application further includes: a request signal transmission unit 701, configured to transmit a request signal requesting to change the operation state to the controlling apparatus (such as the apparatus 500), wherein, the control signal receiving unit 601 is configured to receive a control signal which is a reply to the request signal from the controlling apparatus; and the state changing unit 602 is configured to change the operation state of the cell based on the replied control signal.

The present embodiment is distinguished form the fifth embodiment in that, the cell judges with respect to whether to change the operation state at first, and then in the case of deeming to change, transmits a request to the controlling apparatus. In an example, the request signal transmission unit 701 can be configured to determine whether to transmit the request signal based on at least one of the following parameters: a signal to interference plus noise ratio (SINR) of a user of the cell, a re-transmitting probability of a user of the cell, and a traffic amount of a user of the cell. As stated above, the user of the cell mentioned herein can also be an edge user of the cell only.

Specifically, the request signal transmission unit 701 can transmit the request signal when at least one of the following conditions is met: the SINR of the user is lower than a predetermined threshold, the re-transmitting probability is higher than a predetermined probability, and the traffic amount is lower than a predetermined value.

Of course, the request signal transmission unit 701 can also transmit the request signal when other conditions relating to interference and/or load are met. As to the details, please refer to the content in the second embodiment, and will not be repeated here.

Preferably, the request contains suggestion of adjusting the level of sleep or sleep mode, the relevant communication quality, interference or load conditions. The controlling apparatus performs the above mentioned related processing making use of at least one of the relevant communication quality, interference or load conditions contained therein, and then transmit the acquired control signal as a reply to the control signal receiving unit 601.

In one implementation, it can be set as follows: when the reply and the request are identical, it means the controlling apparatus permits the change requested by the cell, while when the reply and the request are different from each other, it means the controlling apparatus corrects the change requested by the cell, and the cell should perform change of operation state according to the received reply. In addition, if no reply is received, it means the controlling apparatus does not permit change of operation state, and the cell maintains its original operation state.

In this embodiment, the change of operation state to be performed transmitted by the apparatus 700 can be determined using a component with similar functions to the information acquiring unit 103, the state change determining unit 101 and the sleep mode determining unit 102. In other words, the apparatus 700 can determine the change of operation state to be performed based on at least one of the communication characteristics of users of the cell it is located in, the interference between the cell it is located in and the adjacent cells, the load of the cell it is located in or the load to be shunted to the cell it is located in from other cells. It is to be understood that, the apparatus 700 can also adopt other manners to determine the change of operation state to be performed, and the manners are not limited thereto.

<The Seventh Embodiment>

Figure 21:
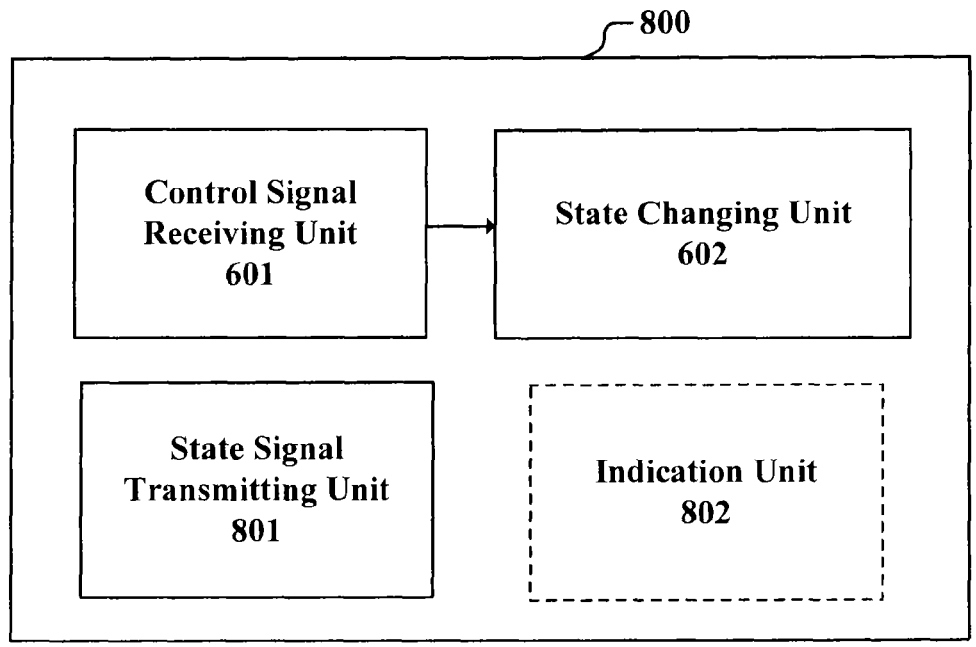
FIG. 21 is a structural block diagram of the apparatus for changing operation state of a cell according to still another embodiment of the present application.

As shown in FIG. 21, besides the units in the apparatus 600 described with reference to FIG. 19, the apparatus 800 for changing operation state of a cell according to still another embodiment of the present application further includes: a state signal transmitting unit 801, configured to transmit an indication signal indicating the change of operation state to the above mentioned controlling apparatus.

In this embodiment, the cell can change the sleep mode (include the level of sleep) by itself, and the apparatus 800 report the change performed to the controlling apparatus via the state signal transmitting unit 801. At this time, if the controlling apparatus does not permit such change, it can transmit back corresponding control signal, and the apparatus 800 has to obey the command from the controlling apparatus.

Similar to the sixth embodiment, in this embodiment, the apparatus 800 can determine the change of operation state to be performed using a component with similar functions to the information acquiring unit 103, the state change determining unit 101 and the sleep mode determining unit 102. In other words, the apparatus 800 can determine the change of operation state to be performed based on at least one of the communication characteristics of users of the cell it is located in, the interference between the cell it is located in and the adjacent cells, the load of the cell it is located in or the load to be shunted to the cell it is located in from other cells. Similarly, the apparatus 800 can also adopt other manners to determine the change of operation state to be performed, and the manners are not limited thereto.

In addition, although not shown in FIG. 21, the apparatus 600, 700 and 800 according to the fifth embodiment to the seventh embodiment can further include a component for reporting its current sleep mode to the controlling apparatus.

Furthermore, as indicated by the dashed line block in FIG. 21, besides the units in the apparatus 600 described with reference to FIG. 19, the apparatus 800 further includes an indication unit 802, configured to transmit a state change indication related to the operation state changing to user devices of the cell.

<The Eighth Embodiment>

During the description of each of the above mentioned apparatus, a base station is substantively provided as well. The base station includes one of the apparatus 100 to 500 in the first embodiment to the fourth embodiment or one of the apparatus 600 to 800 in the fifth embodiment to the seventh embodiment.

Specifically, the base station for controlling the cells to be controlled can include one of the apparatus 100 to 500, and the cell base station can include one of the apparatus 100 to 800.

<The Ninth Embodiment>

It is apparent that some processing or methods are also disclosed in the description above on the apparatus for controlling a change of operation state of a cell and the apparatus for changing operation state of a cell according to embodiments of the present invention. Below, the summary of the methods is described without repeating the details which are already discussed above, however, it should be noted that although disclosed in the description of the apparatus for controlling a change of operation state of a cell and the apparatus for changing operation state of a cell, the methods do not certainly employ or are not certainly executed by the aforementioned components. For instance, embodiments of the apparatus for controlling a change of operation state of a cell and the apparatus for changing operation state of a cell may be partially or completely achieved by hardware and/or firmware, and the method for controlling a change of operation state of a cell and the method for changing operation state of a cell described below may be fully achieved by a computer-executable program, although the methods may employ the hardware and/or firmware of the apparatus for controlling a change of operation state of a cell and the apparatus for changing operation state of a cell.

Figure 22:
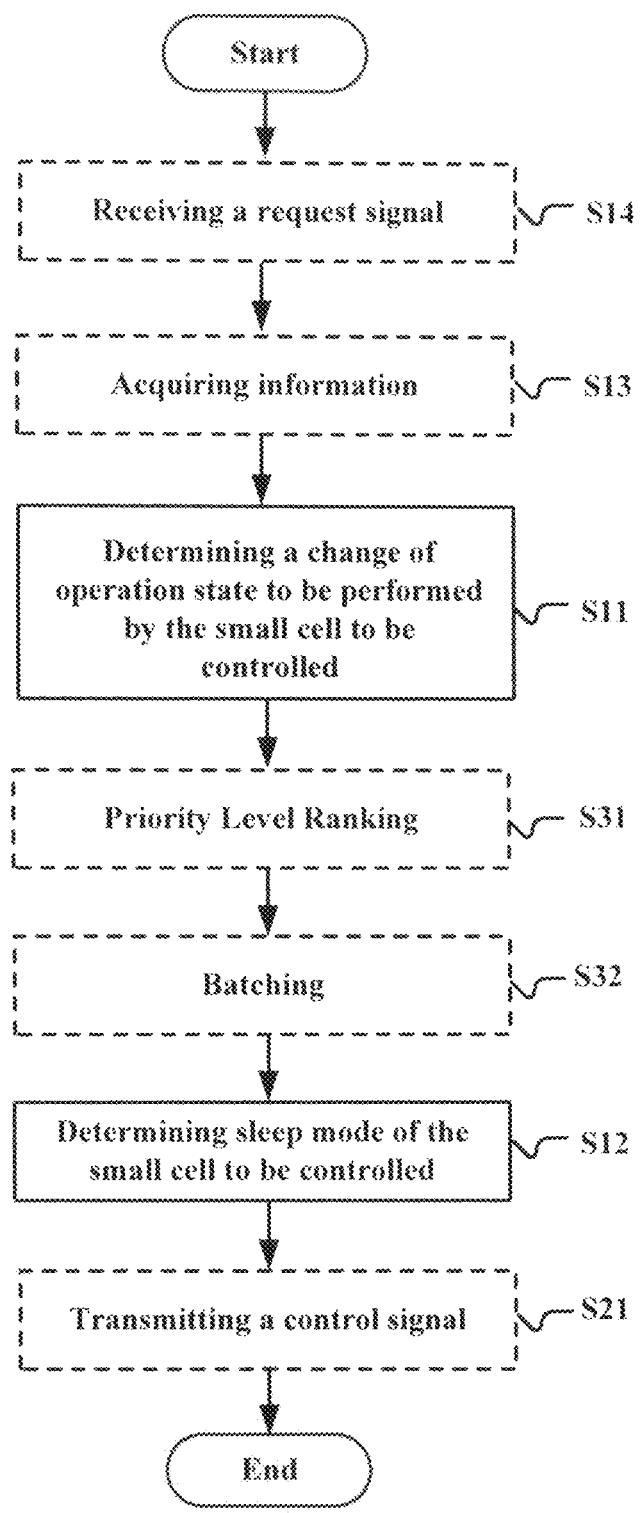
FIG. 22 is a flowchart illustrating the method for controlling a change of operation state of a cell according to embodiments of the present application.

FIG. 22 shows a flowchart of the method for controlling a change of operation state of a cell according to embodiments of the present application, wherein, the dashed line blocks represent optional steps. The method includes: determining the change of operation state to be performed by the cell to be controlled (S11), the change of operation state comprising change from active state to sleep state; and determining a sleep mode for the cell to be controlled so that the cell to be controlled has a different sleep mode from its adjacent cell, when it is determined to perform the change of operation state of the cell to be controlled (S12).

In step S11, various manners can be adopted to determine the change of operation state to be performed. In step S12, a sleep mode corresponding to a level of sleep which is different from the levels of cells adjacent to the cell to be controlled can be determined as the sleep mode for the cell to be controlled. Moreover, the coloring method can be used to determine the sleep mode in step S12.

The operation state includes multiple levels of sleep from low to high, and the cell to be controlled has a lighter degree of sleep when it is at a lower level of sleep than at a higher level of sleep, the change of operation state including switching among the multiple levels of sleep. As an example, the levels of sleep include at least one of sub-frame sleep and sub-carrier sleep.

In addition, the setting of the levels of sleep includes but is not limited to the following example: the levels of sleep includes sub-frame sleep, sub-carrier downlink sleep, sun-carrier uplink and downlink sleep, and cell base station downlink sleep.

In an embodiment, in the step S12, a sleep mode corresponding to a sleep sub-frame which is different from the sleep sub-frames of cells adjacent to the cell to be controlled is determined as the sleep mode for the cell to be controlled, or a sleep mode corresponding to a sleep sub-carrier which is different from the sleep sub-carriers of cells adjacent to the cell to be controlled is determined as the sleep mode for the cell to be controlled.

In such a situation, in step S11, with respect to a part of users of the cell to be controlled, the change of operation state for the part of users to be performed by the cell to be controlled is determined.

As shown in FIG. 22, the method can further include: transmitting a signal including at least the determined sleep mode as a control signal to the cell to be controlled to control it to perform the change of operation state (S21). Alternatively, the step S21 can also be transmitting a control signal including at least a signal of the determined sleep mode to a base station controlling the cell to be controlled. The format of the control signal can be determined at least according to the number of the sleep modes.

In addition, the method can further include the step S13 of acquiring information, which is used for determining the change of operation state to be performed in step S11. As an example, the information at least includes the communication characteristics of a user of the cell to be controlled. The communication characteristics include at least one of the following parameters: a signal to interference plus noise ratio (SINR) of the user, a re-transmitting probability of the user, and a traffic amount of the user. When at least one of the following conditions is met, it is determined to perform the change of operation state: the signal to interference plus noise ratio of the user is lower than a predetermined threshold, the re-transmitting probability is higher than a predetermined probability, and the traffic amount is lower than a predetermined value.

In addition, other information can also be acquired in step S13. for example, in step S13, a number of high-interference user terminals in the adjacent cell can be acquired to determine a degree of interference the cell to be controlled produced to the adjacent cell, wherein, the interferences the high-interference user terminal being subjected to from the cell to be controlled exceed a predetermined limit.

In an example, in step S13, whether a user terminal in the adjacent cell is a high-interference user terminal can be determined based on an uplink signal of the user terminal which has been received by the cell to be controlled. The uplink signal can be SRS, PRACH or PUSCH, PUCCH.

Figure 23:
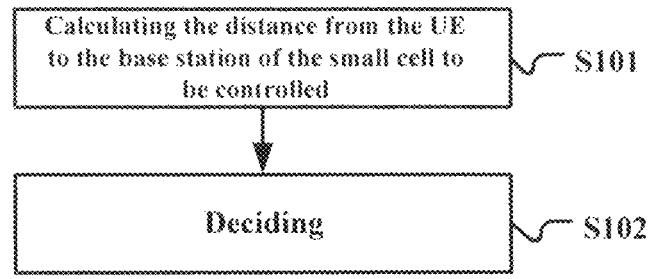
FIG. 23 is a flowchart illustrating an example of sub-steps of the step S13 in FIG. 22.

Specifically, as shown in FIG. 23, the step S13 can include the following sub-steps: calculating a distance from the user terminal to a base station of the cell to be controlled (S101); and judging the user terminal to be a high-interference user terminal, in the case that power of the uplink signal is higher than a first predetermined threshold, the distance is smaller than the second predetermined threshold, and the cell to be controlled makes use of the same frequency spectral resources as the user terminal does (S102).

In the step S101, when performing calculation using the uplink signal SRS or PRACH, an uplink time advance (TA) from the user terminal to the base station of the cell to be controlled is calculated based on the SRS or PRACH signal, and the distance is estimated according to this time advance. While performing calculation using the uplink signal PUSCH or PUCCH, an uplink time advance of the user terminal is acquired from its served cell, this time advance is added with a time deviation between a timing the cell to be controlled detects the PUSCH/PUCCH and an uplink synchronization timing, and the sum is taken as an uplink time advance from the user terminal to the base station of the cell to be controlled, so as to estimate the distance according to this time advance. The details of this algorithm have been described in particular in the previous embodiments, and will not be omitted here.

Further, in step S13, a degree of interference the cell to be controlled produced to the adjacent cell which is indicated by at least one of signals of OI, HII and RNTP from the adjacent cell, can also be acquired.

As stated above, the detection of the degree of interference can be performed on the controlling side, and can also be performed on the side of the base station of the cell to be controlled and reported to the controlling side.

Then, in step S11, it can be determined whether to increase or decrease the level of sleep of the cell to be controlled by one or more levels based on the above degree of interference, wherein, the number of levels to be decreased or increased is determined according to the degree of interference.

For example, it is possible to compare the degree of interference with a first threshold and/or a second threshold lower than the first threshold. When the degree of interference is higher than the first threshold, it is determined to increase the level of sleep of the cell to be controlled by one or more levels, and when the degree of interference is lower than the second threshold, it is determined to decrease the level of sleep of the cell to be controlled by one or more levels.

In addition, in step S13, it is possible acquire load of the cell to be controlled or load to be shunted to the cell to be controlled from other cells, and in step S11, it is possible to determine the change of operation state to be performed by the cell to be controlled based on the acquired load or based on both the acquired interference and the acquired load.

In step S13, the load of the cell to be controlled within a predetermined time period can be acquired, and in step S11, it is determined whether to increase or decrease the level of sleep of the cell to be controlled by one or more levels based on the load, wherein, the number of levels to be decreased or increased is determined according to the conditions of the load.

In an example, it is possible to acquire a number of user terminals with high signal-to-noise ratio which are served by the cell to be controlled within the predetermined time period so as to determined the load, wherein, the user terminals with high signal-to-noise ratio are the following ones: the signal-to-noise ratio of an uplink signal which a base station of the cell to be controlled received from the user terminal exceeds a predetermined threshold.

In another example, it is possible to acquire user terminals or carriers to be shunted to the cell to be controlled from other cells as the load to be shunted, and determine to decrease the level of sleep of the cell to be controlled by one or more levels when the load to be shunted exceeds a predetermined amount, the number of levels to be decreased depending on the amount of the load to be shunted. It is to be noted that, the carriers to be shunted state herein substantively refer to the user terminals using these carriers.

Figure 24:
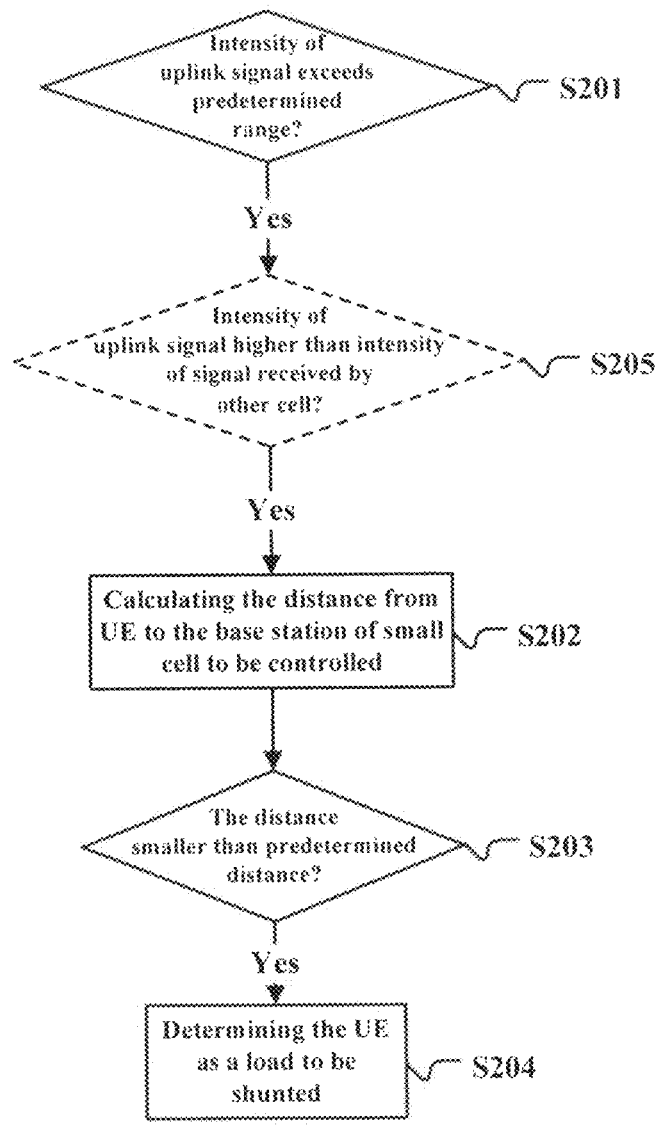
FIG. 24 is a flowchart illustrating another example of sub-steps of the step S13 in FIG. 22.

Specifically, the step S13 can include the following sub-steps, as shown in FIG. 24: judging whether an intensity of the uplink signal from the user terminal of the other cells exceeds a predetermined range (S201); calculating a distance from the user terminal to a base station of the cell to be controlled in the case that the intensity of the signal exceeds the predetermined range (S202); and determining the user terminal to be the load to be shunted (S204) in the case that the distance is shorter than a predetermined distance (S203).

The Step S13 can further include the following step (which is denoted by a dashed line block in FIG. 24): comparing signal power detected by the cell to be controlled from the user terminal (i.e., the intensity of the uplink signal) and signal power detected by the other cells from the user terminal (S205), and determining the user terminal to be the load to be shunted in the case that the signal power detected by the cell to be controlled is higher than the signal power detected by the other cells and the above distance is shorter than the predetermined distance.

As for small cells, the steps S13 can further include the following step: acquiring a number of carriers of a macro cell to be shunted which cover the small cell to be controlled, wherein, when a PDSCH resource utilizing ratio of a carrier of the macro cell exceeds a predetermined percentage, this carrier is determined to be a carrier to be shunted. In an example, the macro cell can transmit a reference signal on each of the carriers to be shunted, so that the small cell to be controlled detects the number of the received carriers to be shunted by this reference signal.

In addition, although not shown in the FIG. 24, the step S13 can also include the various sub-steps shown in FIG. 23. Moreover, similarly, the detection of load can be performed on the controlling side, and can also be performed on the side of the base station of the cell to be controlled and then reported to the controlling side.

Referring back to FIG. 22, the above method can further include a step S31 which is indicated by a dashed line block: in the case that it is determined there are multiple cells to be controlled whose operation states are to be changed, priority levels for changing their states are ranked. By this step, cells to be controlled whose operation states are to be changed at first can be selected according to a certain strategy.

In the step S31, ranking can be performed according to at least one of the following: communication characteristics of a user of the cell to be controlled, the load of each cell to be controlled or the load to be taken over by each cell to be controlled which is shunted by other cells, the degree of interference each cell to be controlled produced to its adjacent cell, the feedback bandwidth or transmission delay between each cell to be controlled and a macro cell, and the number of user terminals which use the carrier of each cell to be controlled as the primary component carrier and a number of user terminals with double connections of connecting a base station of a macro cell and the small cell to be controlled.

In the case of ranking according to the above mentioned five aspects, the priority degree for the five aspects can be set to be decreasing in turn. Of course, other settings can be adopted either, and the example is not limiting.

As shown by another dashed line block in FIG. 22, the method can further include step S32: changing the operation states of each cell to be controlled in batches according to the acquired ranking, wherein, operations of each of the previous steps are performed again after the operations states of each batch of the cells to be controlled are changed.

In addition, the method can further include a step S14 indicated by another dashed line block: receiving, from the cell to be controlled, a signal requesting to change the operation state thereof, wherein, the operations of step S11 and S12 as well as other optional steps are performed in response to this signal. This signal can be acquired for example by the base station of the cell to be controlled by performing operations of step S11 and the like.

The various steps of the method for controlling change of operation state of a cell have been described with reference to FIG. 22 to FIG. 24 in the above. The cell stated herein can be a small cell. The specific details can be with reference to the previous description for the apparatus. In the following, the method for changing operation state of a cell will be briefly described with reference to FIG. 25.

Figures 25, 26:
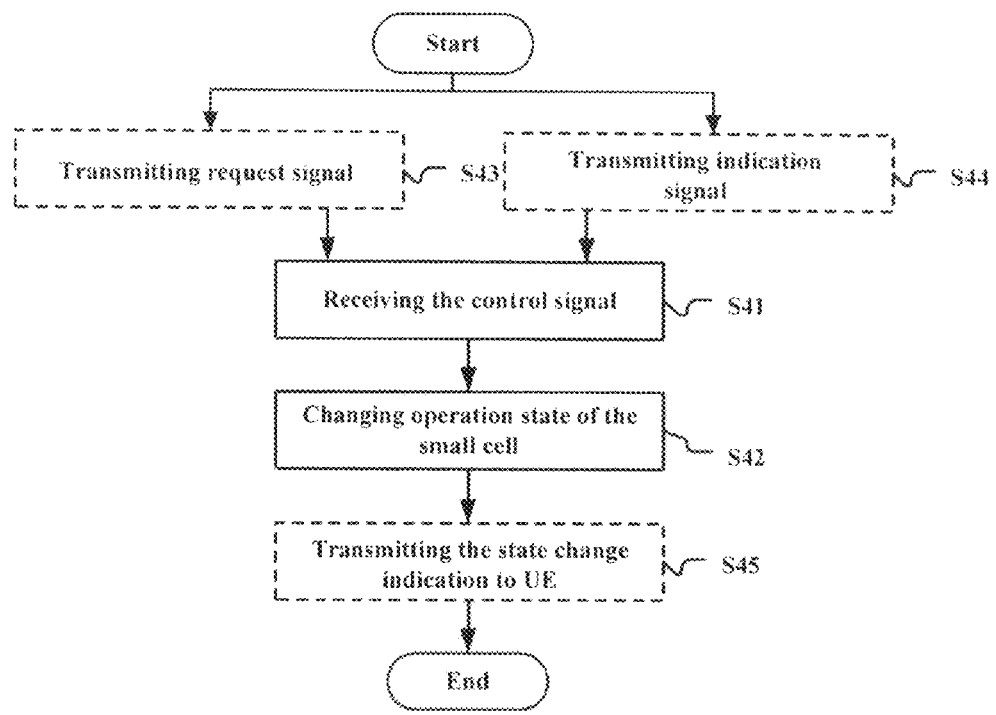
FIG. 25 is a flowchart illustrating the method for changing operation state of a cell.
FIG. 26 shows the interference list in an system instance.

As shown in FIG. 25, the method includes: receiving a control signal from a controlling apparatus (S41); and changing the operation state of the cell based on the control signal (S42). The controlling apparatus can be the above mentioned apparatus for controlling change of operation state of a cell. In such a situation, the cell side receives the control signal from the controlling apparatus passively.

In addition, the method can further include a step S43: transmitting a request signal requesting to change the operation state to the controlling apparatus. In such a situation, the cell side detects the change of operation state to be performed by itself at first, transmit the corresponding request signal to the controlling apparatus, receive a control signal as a reply from the controlling apparatus, and change the operation state of the cell based on the control signal.

It can be determined whether to transmit the request signal based on at least one of the following parameters: a signal to interference plus noise ratio (SINR) of a user of the cell, a re-transmitting probability of a user of the cell, and a traffic amount of a user of the cell. The request signal is transmitted in step S43 when at least one of the following conditions is met: the signal to interference plus noise ratio of the user is lower than a predetermined threshold, the re-transmitting probability is higher than a predetermined probability, and the traffic amount is lower than a predetermined value. Of course, the request signal can also be transmitted when other conditions related to the above mentioned interference and/or load are met, and the details will not be repeated here.

As another example, the method can further include a step S44: transmitting an indication signal indicating the change of operation state to the controlling apparatus. In such a situation, the cell changes its operation state by itself, transmitting the indication signal indicating such a change to the controlling apparatus. If the controlling apparatus does not permit such a change, it will transmit a control signal indicating how to change and the cell should change the operation state again based on the control signal.

In addition, the method can further include a step S45: transmitting a state change indication related to the operation state changing to user devices of the cell.

Note that, in the present application, the change of operation state of the cell actually refers to the change of the sleep mode (including the level of sleep) of the cell base station, unless explained in particular.

In order to facilitate the understanding of the above method, an exemplary system embodiment is given in the following with reference to the application scenario of FIG. 1 and the lists in FIG. 26 and FIG. 27, to describe how to implement the method of changing the sleep modes of the cell base stations by grading and in batches. Small cell base stations are taken as examples here. However, it is to be understood it can also be applied to the situation including both small cells and macro cells.

Each small cell base station detects the uplink signal. For example, the small cell base station Z detects that the user UEa of the adjacent small cell A is a high-interference user. That is, the power of the uplink signal received by the base station Z from the user UEa exceeds a certain value and the distance from UEa to the base station Z (the method based on the TA measurement described in the previous embodiment can be adopted.) is shorter than a certain distance, thereby judging the user UEa as a high-interference user of the base station Z. Since the interference is mutual, it can also be judged that the user UEa produces high interference to the base station Z. Such kind of information is reported to the controlling apparatus, thereby generating the interference list shown in FIG. 26.

As shown in FIG. 26, capital letters A-Z are used to denote small cell base stations and small cells in the controlling range, and small letters a-z are used to denote user terminals of the small cells. The interference lists shown in FIG. 26 and FIG. 27 can be stored for example in the above mentioned controlling apparatus, and can also be stored in a separate storage device. Small cells whose levels of sleep are to be changed are selected using this interference list.

As can be seen from FIG. 26, as a high-interference small cell whose user terminals produce high interference to other small cells, A is reported 4 times, B is reported 3 times, C is reported 3 times, D is reported twice, E is reported twice, and F is reported once. The base station being reported the most times produces most serious interference to other small cells, and thus be provided with the highest priority level of increasing the level of sleep, i.e., A>B=C>D=E>F. The adjacent base station subjected to the interference from the base station most seriously will become the preferred shunting destination to which the base station release its load after the base station sleeps. Therefore, when making the decision of increasing the level of sleep of the base station, the shunted load to be taken over by this adjacent base station can be pre-estimated according to the decision, and thus it can be determined to decrease the level of sleep of the adjacent base station as well as the priority level of decreasing the level of sleep thereof simultaneously. That is, the base station Z reports about A the most times, and the priority level of decreasing the level of sleep of Z is highest. The base station V reports about B the most times, and the priority level of decreasing the level of sleep of V is the second highest. As so on, the priority level of decreasing level of sleep is: Z>V=S>P=M>K.

The scheme of level of sleep is changed by grading and in batches. The levels of sleep of two base stations are increased and the levels of sleep of two base stations are decreased first. The base stations whose level of sleep is to be increased is A, B and C, and the base stations whose level of sleep is to be decreased is Z, V and S. It is necessary to compare the priority level of B, C and V, S. The number of the high-interference UEs of B is more than that of C, and the priority level of increasing the level of sleep of B is higher than that of C.

In the case of increasing the level of sleep of B and C, V and S which are base stations subjected to the most serious interferences from them will take over the same amount of shunted load. Thus, the number of carriers to be shunted of the macro cell covering the small cell is further compared. At this time, the macro cell has 5 carriers, among which 3 carriers has a PDSCH resource utilization ratio beyond the threshold and are carriers to be shunted. V receives 3 carriers to be shunted, and S receives 1 carrier to be shunted. Therefore, the priority level of decreasing the level of sleep of V is higher than that of S. Consequently, the levels of sleep of the base stations A and B are increased and the levels of sleep of the base stations Z and V are decreased.

For example, the levels of sleep of A, B, Z and V are all changed to the sub-frame sleep. The controlling apparatus determines the sub-frame sleep mode for them respectively using the coloring method according to their geographical locations, and transmits corresponding control signal to them. According to the format of the control signal stated in the first embodiment, for example, control signals "001", "010", "011" and "010" can be transmitted to A, B, Z and V respectively. After receiving the control signal, each base station performs the change of operation state according to corresponding sleep mode.

Then, the interference list is detected again. At this time, the interference list is shown in FIG. 27. C is reported 3 times, A is reported twice, D is reported twice, E is reported twice, and F is reported once. Therefore, the priority level of increasing the level of sleep is: C>A=D=E>F, and the priority level of decreasing the level of sleep is: S>X=P=M>K.

Similarly, according to the scheme of changing the level of sleep by grading and in batches, the levels of sleep of two base stations are increased and the levels of sleep of two base stations are decreased first. The base stations whose level of sleep is to be increased is C, A, D and E, and the base stations whose level of sleep is to be decreased is S, X, P and M. It is necessary to compare the priority level of A, D, E and X, P, M respectively. The number of the high-interference UEs of B is more than that of C, and the priority level of increasing the level of sleep of B is higher than that of C.

The number of high-interference UEs is the same for A, D and E. Further, the number of primary serving cell users, i.e., the number of users which use the carrier provided by this cell as the primary component carrier, is compared. When the number of users who take the base station A as a primary cell is 5, the number of users who take the base station D as a primary cell is 5, and the number of users who take the base station E as a primary cell is 10, the priority level of increasing the level of sleep is C>A=D>E. Then the transmission delay is compared. When the average value of the feedback delay between the base station A and the adjacent cell is 50 μs, and the average value of the feedback delay between the base station D and the adjacent cell is 20 μs, the priority level of increasing the level of sleep is C>A>D>E. Therefore, the levels of sleep of the base station C and base station A are increased.

The numbers of high-interference UEs of X, P and M are the same as well. The number of carriers to be shunted of the macro cell covering the small cell is further compared. At this time, the macro cell still has 3 carriers to be shunted. X receives 3 carriers to be shunted, P receives 3 carriers to be shunted, and M receives 1 carrier to be shunted. Therefore, the priority level of decreasing the level of sleep is: S>X=P>M. The number of users with high signal to noise ratio (SNR) is further compared. The cell X has 30 users with high SNR therein, and the cell P has 15 users with high SNR therein. Thus the priority level of decreasing the level of sleep is S>X>P>M. Consequently, the levels of sleep of the base stations S and X are decreased.

For example, the levels of sleep of C and A are changed to the sub-carrier sleep, and the levels of sleep of S and X are changed to the sub-frame sleep. The controlling apparatus determines the sub-carrier sleep mode or the sub-frame sleep mode for them respectively using the coloring method according to their geographical locations, and transmits corresponding control signal to them. According to the format of the control signal stated in the first embodiment, for example, control signals "101", "110", "001" and "010" can be transmitted to C, A and S, X respectively. After receiving the control signal, each base station performs the change of operation state according to corresponding sleep mode.

Then, the above mentioned operations are repeated until the interference list is empty.

It should be understood that although the system embodiment is described as an example, the specific implementation of the present application is not limited thereto, instead, can adopt various manners described above in each embodiment.

In conclusion, the apparatus and method of the present application prevent adjacent cells from using the same resources to transmit data simultaneously by setting different sleep modes for them, thereby decreasing the interference levels between adjacent cells and effectively increasing the resources usage efficiency. Meanwhile, by changing the levels of sleep for the cells to be controlled according to their communication quality, interferences and/or load conditions, energy consumption can be reduced while ensuring the communication quality as much as possible.

The basic principle of the present invention has been described above in conjunction with particular embodiments. However, as can be appreciated by those ordinarily skilled in the art, all or any of the steps or components of the method and apparatus according to the invention can be implemented in hardware, firmware, software or a combination thereof in any computing device (including a processor, a storage medium, etc.) or a network of computing devices by those ordinarily skilled in the art in light of the disclosure of the invention and making use of their general circuit designing knowledge or general programming skills.

As can be appreciated by those skilled in the art, the above mentioned components such as the state change determining unit and the sleep mode determining unit can be implemented by one or more processors, while components such as the transmission unit, the information acquiring unit and the request receiving unit can be implemented by circuit elements such as antennas, filters, modem and codec.

Therefore, the present application further provides an electronic device (1), including a circuit, configured to: determine the change of operation state to be performed by the cell to be controlled, the change of operation state including change from active state to sleep state; and determine a sleep mode for the cell to be controlled so that the cell to be controlled has a different sleep mode from its adjacent cell, when it is determined to perform the change of operation state of the cell to be controlled.

Further, the present application also provides an electronic device (2), including a circuit, configured to: receive a control signal from the electronic device (1); and change the operation state of the cell based on the control signal. Moreover, the present invention further discloses a program product in which machine-readable instruction codes are stored. The aforementioned methods according to the embodiments can be implemented when the instruction codes are read and executed by a machine.

Accordingly, a memory medium for carrying the program product in which machine-readable instruction codes are stored is also covered in the present invention. The memory medium includes but is not limited to soft disc, optical disc, magnetic optical disc, memory card, memory stick and the like.

In the case where the present application is realized by software or firmware, a program constituting the software is installed in a computer with a dedicated hardware structure (e.g. the general computer 2800 shown in FIG. 28) from a storage medium or network, wherein the computer is capable of implementing various functions when installed with various programs.

Figures 27, 28:
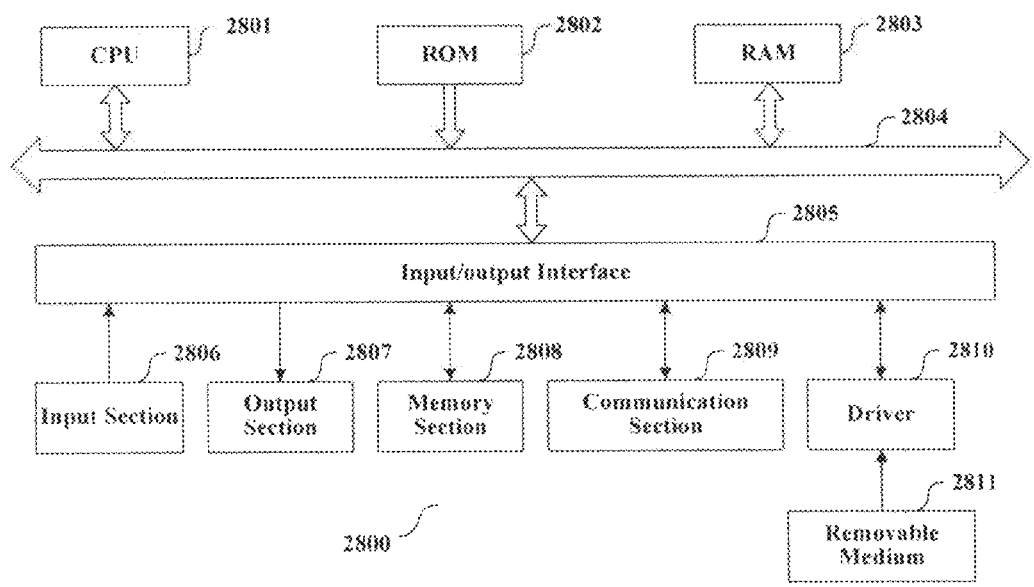
FIG. 27 shows another interference list in an system instance.
FIG. 28 is an exemplary block diagram illustrating the structure of a general purpose personal computer capable of realizing the method and/or apparatus and/or system according to the embodiments of the present invention.

In FIG. 28, a computing processing unit (CPU) 2801 executes various processing according to a program stored in a read-only memory (ROM) 2802 or a program loaded to a random access memory (RAM) 2803 from a storage section 2808. The data needed for the various processing of the CPU 2801 may be stored in the RAM 2803 as needed. The CPU 2801, the ROM 2802 and the RAM 2803 are linked with each other via a bus 2804. An input/output interface 2805 is also linked to the bus 2804.

The following components are linked to the input/output interface 2805: an input section 2806 (including keyboard, mouse and the like), an output section 2807 (including displays such as a cathode ray tube (CRT), a liquid crystal display (LCD), a loudspeaker and the like), a storage section 2808 (including hard disc and the like), and a communication section 2809 (including a network interface card such as a LAN card, modem and the like). The communication section 2809 performs communication processing via a network such as the Internet. A driver 2810 may also be linked to the input/output interface 2805, if needed. If needed, a removable medium 2811, for example, a magnetic disc, an optical disc, a magnetic optical disc, a semiconductor memory and the like, may be installed in the driver 2810, so that the computer program read therefrom is installed in the memory section 2808 as appropriate.

In the case where the foregoing series of processing is achieved through software, programs forming the software are installed from a network such as the Internet or a memory medium such as the removable medium 2811.

It should be appreciated by those skilled in the art that the memory medium is not limited to the removable medium 2811 shown in FIG. 28, which has program stored therein and is distributed separately from the apparatus so as to provide the programs to users. The removable medium 2811 may be, for example, a magnetic disc (including floppy disc (registered trademark)), a compact disc (including compact disc read-only memory (CD-ROM) and digital versatile disc (DVD), a magneto optical disc (including mini disc (MD) (registered trademark)), and a semiconductor memory. Alternatively, the memory medium may be the hard discs included in ROM 2802 and the storage section 2808 in which programs are stored, and can be distributed to users along with the device in which they are incorporated.

To be further noted, in the apparatus, method and system according to the invention, the respective components or steps can be decomposed and/or recombined. These decompositions and/or recombinations shall be regarded as equivalent solutions of the invention. Moreover, the above series of processing steps can naturally be performed temporally in the sequence as described above but will not be limited thereto, and some of the steps can be performed in parallel or independently from each other.

Finally, to be further noted, the term "include", "comprise" or any variant thereof is intended to encompass nonexclusive inclusion so that a process, method, article or device including a series of elements includes not only those elements but also other elements which have been not listed definitely or an element(s) inherent to the process, method, article or device. Moreover, the expression "comprising a(n) . . . " in which an element is defined will not preclude presence of an additional identical element(s) in a process, method, article or device comprising the defined element(s)" unless further defined.

Additionally, the present technology may also be configured as below.

(1) An apparatus for controlling a change of operation state of a cell, comprising:

a state change determining unit, configured to determine the change of operation state to be performed by the cell to be controlled, the change of operation state comprising change from active state to sleep state; and a sleep mode determining unit, configured to determine a sleep mode for the cell to be controlled so that the cell to be controlled has a different sleep mode from its adjacent cells, when the state change determining unit determines to perform the change of operation state of the cell to be controlled.

(2) The apparatus according to (1), wherein, the operation state comprises multiple levels of sleep from low to high, the cell to be controlled has a lighter degree of sleep when it is at a lower level of sleep than at a higher level of sleep, the change of operation state comprising switching among the multiple levels of sleep.

(3) The apparatus according to (1), further comprising a transmission unit, configured to transmit a signal comprising at least the sleep mode determined by the sleep mode determining unit as a control signal to the cell to be controlled, to control the cell to be controlled to perform the change of operation state.

(4) The apparatus according to (2), wherein, the sleep mode determining unit is configured to determine a sleep mode corresponding to a level of sleep which is different from the levels of cells adjacent to the cell to be controlled, as the sleep mode for the cell to be controlled.

(5) The apparatus according to any one of (1) to (4), further comprising an information acquiring unit, configured to acquire communication characteristics of a user of the cell to be controlled, wherein, the state change determining unit is configured to determine the change of operation state to be performed at least based on the communication characteristics.

(6) The apparatus according to (5), wherein, the communication characteristics comprising at least one of the following parameters: a signal to interference plus noise ratio of the user, a re-transmitting probability of the user, and a traffic amount of the user.

(7) The apparatus according to (6), wherein, the state change determining unit is configured to determine to perform the change of operation state when at least one of the following conditions is met: the signal to interference plus noise ratio of the user is lower than a predetermined threshold, the re-transmitting probability is higher than a predetermined probability, and the traffic amount is lower than a predetermined value.

(8) The apparatus according to (2), wherein, the levels of sleep comprises at least one of sub-frame sleep and sub-carrier sleep.

(9) The apparatus according to (8), wherein, the sleep mode determining unit is configured to determine a sleep mode corresponding to a sleep sub-frame which is different from the sleep sub-frames of cells adjacent to the cell to be controlled, as the sleep mode for the cell to be controlled, or determine a sleep mode corresponding to a sleep sub-carrier which is different from the sleep sub-carriers of cells adjacent to the cell to be controlled, as the sleep mode for the cell to be controlled.

(10) The apparatus according to (9), wherein, the state change determining unit is configured to, with respect to a part of users of the cell to be controlled, determine the change of operation state for the part of users to be performed by the cell to be controlled.

(11) The apparatus according to (1), further comprising a transmission unit, configured to transmit a control signal comprising at least a signal of the sleep mode determined by the sleep mode determining unit to a base station controlling the cell to be controlled.

(12) The apparatus according to any one of (1) to (4), further comprising:
a request receiving unit, configured to receive, from the cell to be controlled, a signal requesting to change the operation state thereof,
wherein, the state change determining unit determines the change of operation state to be performed by the cell to be controlled in response to the signal.

(13) The apparatus according to (3), wherein, a format of the control signal is determined at least based on a number of the sleep modes.

(14) The apparatus according to any one of (1) to (4), wherein, the cell is a small cell.

(15) An apparatus for changing operation state of a cell, comprising:
a control signal receiving unit, configured to receive a control signal from the apparatus for controlling according to any one of (1) to (14); and
a state changing unit, configured to change the operation state of the cell based on the control signal.

(16) The apparatus according to (15), further comprising:
a request signal transmission unit, configured to transmit a request signal requesting to change the operation state to the apparatus for controlling,
wherein, the control signal receiving unit is configured to receive a control signal which is a reply to the request signal from the apparatus for controlling; and
the state changing unit is configured to change the operation state of the cell based on the replied control signal.

(17) The apparatus according to (16), wherein, the request signal transmission unit is configured to determine whether to transmit the request signal based on at least one of the following parameters: a signal to interference plus noise ratio of a user of the cell, a re-transmitting probability of a user of the cell, and a traffic amount of a user of the cell.

(18) The apparatus according to (15), further comprising an indication unit, configured to transmit a state change indication related to the operation state changing to user devices of the cell.

(19) A base station, comprising the apparatus according to any one of (1) to (14) or the apparatus according to any one of (15) to (18).

(20) A method for controlling a change of operation state of a cell, comprising:
determining the change of operation state to be performed by the cell to be controlled, the change of operation state comprising change from active state to sleep state; and
determining a sleep mode for the cell to be controlled so that the cell to be controlled has a different sleep mode from its adjacent cell, when it is determined to perform the change of operation state of the cell to be controlled.

(21) A non-transitory computer readable storage device having instructions stored therein that when executed by processing circuitry perform a method for controlling a change of operation state of a cell, the method comprising:
determining the change of operation state to be performed by the cell to be controlled, the change of operation state comprising change from active state to sleep state; and
determining a sleep mode for the cell to be controlled so that the cell to be controlled has a different sleep mode from its adjacent cell, when it is determined to perform the change of operation state of the cell to be controlled.

Although the embodiments of the invention have been described above in detail in connection with the drawings, it shall be appreciated that the embodiments as described above are merely illustrative but not limitative of the invention. Those skilled in the art can make various modifications and variations to the above embodiments without departing from the spirit and scope of the invention. Therefore, the scope of the invention is defined merely by the appended claims and their equivalents.

The invention claimed is:

1. An apparatus for controlling a change of operation state of a cell, comprising:
circuitry configured to:
determine the change of the operation state to be performed by the cell when a distance between a user equipment (UE) within the cell and a base station within the cell is greater than or equal to a predetermined threshold, the change of the operation state comprising a change from an active state to a sleep state;
determine a sleep mode for the UE so that the UE has a different sleep mode than another UE from another cell adjacent to the cell when the change of the operation state of the cell is determined to be performed when the distance is greater than or equal to the predetermined threshold; and
determine to maintain a current state of the UE when the distance between the UE and the base station is less than the predetermined threshold,
wherein the circuitry is configured to determine a data format of a control signal based on information comprising a total number of sleep modes that can be determined for the cell.

2. The apparatus according to claim 1, wherein, the operation state comprises multiple levels of sleep from low to high, the cell has a lighter degree of sleep when it is at a lower level of sleep than at a higher level of sleep, the change of the operation state comprising switching among the multiple levels of sleep.

3. The apparatus according to claim 2, wherein, the circuitry is configured to determine the sleep mode corresponding to a level of sleep which is different from levels of sleep of adjacent cells.

4. The apparatus according to claim 2, wherein, the multiple levels of sleep comprise at least one of sub-frame sleep or sub-carrier sleep.

5. The apparatus according to claim 4, wherein, the circuitry is configured to determine a sleep sub-frame, which is different from sleep sub-frames of adjacent cells, as the sleep mode for the UE, or to determine a sleep sub-carrier, which is different from sleep sub-carriers of the adjacent cells, as the sleep mode for the UE.

6. The apparatus according to claim 5, wherein, the circuitry is configured to, with respect to a part of users of the cell, determine the change of the operation state for the part of users to be performed by the cell.

7. The apparatus according to claim 1, wherein the circuitry is configured to acquire communication characteristics of the UE of the cell, and to determine the change of the operation state to be performed at least based on the communication characteristics.

8. The apparatus according to claim 7, wherein, the communication characteristics comprise at least one of a following parameters: a signal to interference plus noise ratio of the UE, a re-transmitting probability of the UE, or a traffic amount of the UE.

9. The apparatus according to claim 8, wherein, the circuitry is configured to determine to perform the change of the operation state when at least one of a following conditions is met: the signal to interference plus noise ratio of the UE is lower than a predetermined threshold, the re-transmitting probability is higher than a predetermined probability, or the traffic amount is lower than a predetermined value.

10. The apparatus according to claim 1, wherein the circuitry is configured to transmit a control signal comprising at least a signal of the determined sleep mode to the base station controlling the cell.

11. The apparatus according to claim 1, wherein the circuitry is configured to:
receive, from the base station of the cell, a request signal, the request signal including a suggestion to adjust the operation state of the cell, and
determine the change of the operation state to be performed by the cell in response to the request signal.

12. The apparatus according to claim 1, wherein, the cell is a small cell.

13. The apparatus according to claim 1, wherein the circuitry is configured to:
transmit the control signal; and
control the change of the operation state of the cell based on the control signal.

14. The apparatus according to claim 13, wherein the circuitry is configured to:
receive, from the base station of the cell, a request signal, the request signal including a suggestion to adjust the operation state,
transmit the control signal which is a reply to the request signal; and
control the change of the operation state of the cell based on the control signal.

15. The apparatus according to claim 14, wherein, the circuitry is configured to receive the request signal when a value of at least one of a signal to interference plus noise ratio of the UE of the cell, a re-transmitting probability of the UE of the cell, or a traffic amount of the UE of the cell is above or below a corresponding threshold.

16. The apparatus according to claim 13, wherein a state change indication related to the change of the operation state is transmitted to a plurality of UE of the cell.

17. The apparatus according to claim 1,
wherein the circuitry is configured to transmit a signal comprising at least the determined sleep mode as the control signal to the cell, to control the cell to perform the change of the operation state.

18. The apparatus according to claim 1, wherein the circuitry is configured to determine the sleep mode for the UE based on other sleep modes assigned to a plurality of UE in cells adjacent to the cell.

19. A method for controlling a change of operation state of a cell, comprising:
determining, by circuitry of an apparatus, the change of the operation state to be performed by the cell, the change of the operation state comprising a change from an active state to a sleep state;
determining a sleep mode for the cell so that the cell has a different sleep mode from its adjacent cell when the change of the operation state of the cell is determined to be performed;
receiving, by the apparatus from a base station of the cell, a request signal, the request signal including a suggestion to adjust the operation state of the cell;
determining, by said circuitry, the change of the operation state to be performed by the cell in response to the request signal; and
determining, by said circuitry, a data format of a control signal based on information comprising a total number of sleep modes that can be determined for the cell.

20. A non-transitory computer readable storage device having instructions stored therein that, when executed by processing circuitry, performs a method for controlling a change of operation state of a cell, the method comprising:
determining the change of the operation state to be performed by the cell when a distance between a user equipment (UE) within the cell and a base station within the cell is greater than or equal to a predetermined threshold, the change of the operation state comprising a change from an active state to a sleep state;
determining a sleep mode for the UE so that the UE has a different sleep mode than another UE from another cell adjacent to the cell when the change of the operation state of the cell is determined to be performed when the distance is greater than or equal to the predetermined threshold;
determining to maintain a current state of the UE when the distance between the UE and the base station is less than the predetermined threshold; and
determining a data format of a control signal based on information comprising a total number of sleep modes that can be determined for the cell.

* * * * *